(12) United States Patent
Kreger et al.

(10) Patent No.: US 11,923,898 B2
(45) Date of Patent: Mar. 5, 2024

(54) CALCULATION OF DISTRIBUTED BIREFRINGENCE AND POLARIZATION MODE DISPERSION FROM WAVEGUIDE SCATTER WITH FULL POLARIZATION STATE OPTICAL FREQUENCY DOMAIN REFLECTOMETRY

(71) Applicant: LUNA INNOVATIONS INCORPORATED, Roanoke, VA (US)

(72) Inventors: Stephen T. Kreger, Blacksburg, VA (US); Emily E. H. Templeton, Schenectady, NY (US); Daniel Kominsky, Christiansburg, VA (US); Brian Templeton, Schenectady, NY (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 49 days.

(21) Appl. No.: 17/603,483

(22) PCT Filed: Apr. 15, 2020

(86) PCT No.: PCT/US2020/028204
§ 371 (c)(1),
(2) Date: Oct. 13, 2021

(87) PCT Pub. No.: WO2020/214637
PCT Pub. Date: Oct. 22, 2020

(65) Prior Publication Data
US 2022/0182141 A1 Jun. 9, 2022

Related U.S. Application Data

(60) Provisional application No. 62/833,985, filed on Apr. 15, 2019.

(51) Int. Cl.
H04B 10/07 (2013.01)
H04B 10/071 (2013.01)
H04B 10/079 (2013.01)

(52) U.S. Cl.
CPC ..... *H04B 10/07951* (2013.01); *H04B 10/071* (2013.01)

(58) Field of Classification Search
CPC .......................... H04B 10/07951; H04B 10/71
See application file for complete search history.

(56) References Cited

U.S. PATENT DOCUMENTS 6,856,400 B1  2/2005  Froggatt
2002/0162973 A1*  11/2002  Cordingley ....... H01L 21/76888
250/492.23

(Continued)

OTHER PUBLICATIONS

Extended European Search Report for EP Application No. 20791553.9 dated May 12, 2022, 10 pages.

(Continued)

*Primary Examiner* — Dzung D Tran
(74) *Attorney, Agent, or Firm* — NIXON & VANDERHYE P.C.

(57) ABSTRACT

Local birefringence is determined from a scatter signature of a birefringent waveguide. Four copies of a Rayleigh scatter time delay domain signature of the fiber are collected from two orthogonal polarization received states and from two orthogonal polarization launched states to form a Jones transfer matrix. Obtaining the Jones transfer matrix for the waveguide eliminates the need to align the instrument polarization launch state to the birefringence axes. Birefringence is determined from an autocorrelation of a polarization state averaged function calculated from the transfer matrix terms. Alternatively, the transfer matrix is rotated until fast and slow eigenvectors are separated, fast and slow amplitude functions are generated, and a cross-correlation is (Continued)

performed on the fast and slow amplitude functions in order to determine the birefringence. Because the shift is determined at a high signal-to-noise level with improved sensitivity to the spectral shift, the local birefringence is determined more accurately.

30 Claims, 16 Drawing Sheets

(56) References Cited

U.S. PATENT DOCUMENTS

| | | | |
|---|---|---|---|
| 2006/0204165 A1* | 9/2006 | Froggatt | G01M 11/3172 385/12 |
| 2007/0285669 A1* | 12/2007 | Ajgaonkar | A61B 5/0059 356/482 |
| 2008/0002187 A1* | 1/2008 | Froggatt | G01M 11/3172 356/73.1 |
| 2008/0212917 A1 | 9/2008 | Chen | |
| 2015/0263804 A1 | 9/2015 | Horikx et al. | |
| 2016/0258839 A1 | 9/2016 | Froggatt | |
| 2017/0307474 A1* | 10/2017 | Thévenaz | G01M 11/3181 |

OTHER PUBLICATIONS

C. Dorize et al, "Enhancing the performance of coherent OTDR systems with polarization diversity complementary codes" Optics Express, vol. 26, No. 10, May 4, 2018, 13 pages.

International Search Report for PCT/US2020/028204 dated Jul. 16, 2020, 3 pages.

Written Opinion of the ISA for PCT/US2020/028204 dated Jul. 16, 2020, 10 pages.

Office Action for EP Application No. 20791553.9 dated Jul. 12, 2023, 8 pages.

* cited by examiner

CALCULATION OF DISTRIBUTED BIREFRINGENCE AND POLARIZATION MODE DISPERSION FROM WAVEGUIDE SCATTER WITH FULL POLARIZATION STATE OPTICAL FREQUENCY DOMAIN REFLECTOMETRY

PRIORITY APPLICATION

This application is the U.S. national phase of International Application No. PCT/US2020/028204 filed Apr. 15, 2020 which designated the U.S. and claims priority to U.S. Provisional Patent Application No. 62/833,985 filed Apr. 15, 2019, the entire contents of each of which are hereby incorporated by reference.

TECHNICAL FIELD

The technical field relates to optical measurements, and more particularly, to determining birefringence of a waveguide such as an optical fiber or other optical device.

OVERVIEW

An Optical Frequency Domain Reflectometry (OFDR) instrument may be used to characterize an optical fiber's distributed Rayleigh scatter reflection profile with high spatial resolution and high sensitivity in a single laser optical frequency sweep. The spatial sample spacing of an OFDR instrument is inversely proportional to the swept range of the coherent optical source. For example, a popular commercial reflectometer (Luna Optical Backscatter Reflectometer 4600) can scan over an optical frequency range of 10 THz, yielding a sampling resolution in the optical time delay domain of 0.1 ps, equivalent to 0.01 mm of length in optical fiber in reflection, over a fiber length range of 30 m. The same instrument can also scan a 2000 m distance range in optical fiber with a 0.1 THz optical frequency swept range, producing a spatial sample spacing of 1 mm. In both scan modes, the instrument noise floor is more than 18 dB below the Rayleigh scatter reflection level for telecom grade optical fiber. The ability to characterize fiber Rayleigh scatter with high spatial resolution allows for the computation of distributed insertion loss along the fiber path.

In OFDR, light reflecting from the device under test interferes with light in a reference path. Consider the interference equation that describes the optical power P at a detector as a function of the tunable light source with optical frequency ν:

$$P(\nu) \propto |A_{Ref}| + |A_{Test}| + 2\sqrt{|A_{Ref}||A_{Test}|}\cos(2\pi\nu\tau) \quad (1)$$

In the above equation, $A_{Ref}$ is the amplitude of the light transmitted in the reference path of the interferometer, $A_{Test}$ is the amplitude of the light reflected along the sensor fiber, and τ is the time-of-flight delay difference between the light in the reference and test paths. If the detector power is sampled in equal increments of optical frequency, then a Fourier Transform may be used to convert interference data collected as a function of optical frequency ν (henceforth referred to as the spectral domain) to data spaced in equal increments of time delay τ (henceforth referred to as the time delay domain). The time delay τ is related to distance L along the test path by the waveguide group index of refraction n, where c is the speed of light:

$$\tau = \frac{2nL}{c} \quad (2)$$

By segmenting a section of the Rayleigh scatter profile for the waveguide in the time delay domain and performing an inverse Fourier Transform, an OFDR instrument can also determine the optical spectral reflection profile for that fiber segment. The waveguide segment spectral profile can be compared to a baseline state segment profile to compute a spectral shift, which may be used to compute changes in the fiber strain and temperature state with millimeter spatial resolution.

The fiber Rayleigh scatter time delay domain and spectral domain patterns recorded by an OFDR instrument also can be used to compute the fiber birefringence distribution, as described for example in U.S. Pat. No. 7,330,245, the contents of which are incorporated herein by reference. In a birefringent material, light in different polarization states experiences different group indices of refraction, n. Birefringence ($\Delta n_B$) is the difference in refractive index of those states:

$$\Delta n_B = n_s - n_f, \quad (3)$$

where $n_s$ and $n_f$ are the group refractive indices for light polarized along the slow and fast propagation axes, respectively. By convention $n_s > n_f$, which means for a fixed length of fiber, reflections from light polarized along the slow axis return after reflections from light polarized along the fast axis.

FIG. 1 depicts a cross section of a type of Polarization Maintaining (PM) fiber, in which stress rods manufactured in the fiber produce asymmetric stress in the fiber core, causing light polarized in the plane of the stress rods and light polarized perpendicular to that plane to experience a different effective index of refraction. PM fiber is designed to create sufficient birefringence so that light polarized along the fast axis and the slow axis shown in FIG. 1 separate in delay enough that after a short propagation distance, the light in the two polarization states do not strongly interact. In this case, light in the two polarization states is considered to propagate in separate polarization modes. However, while PM fiber is an example of a birefringent waveguide, not all instances of birefringence, particularly when the birefringence is weak and spatially localized, result in light propagation in different modes, and thus measurements of birefringence in PM fiber are a non-limiting example of a birefringence measurement.

In U.S. Pat. No. 7,330,245, the polarization state of light input to a fiber under test is adjusted to equally populate both fast and slow states in the fiber under test. A segment of the birefringent fiber's Rayleigh scatter signature is measured in the time delay domain, and the spectrum for that segment is computed via a fast Fourier transform (FFT). An autocorrelation performed on the scatter signature spectral data results in a central peak at zero with sideband peaks. The spectral optical frequency difference $\Delta\nu_B$ between the side band peaks and the central peak is proportional to the segment birefringence:

$$\frac{\Delta\nu_B}{\nu} = \frac{\Delta n_B}{n} \quad (4)$$

FIG. 2 shows how the time delay τ can vary at the same fiber position for light polarized along the fast and the slow axes of the birefringent fiber. If an autocorrelation is performed on the time delay domain Rayleigh scatter data segment for a section of fiber that is birefringent, or after a section that is birefringent, a similar central peak and sideband peak pattern is formed, and the time delay equivalent to the spatial separation is equal to the local Polarization Mode Dispersion (PMD). The time delay associated with PMD, denoted by $\tau_{PMD}$, (which is also referred to as the Differential Group Delay (DGD)), is related to the fiber birefringence. For a segment of fiber of length L measured in reflection with constant birefringence $\Delta n_B$, $\tau_{PMD}$ is:

$$\tau_{PMD} = \frac{2\Delta n_B L}{c} \quad (5)$$

In addition, a distributed birefringence signal calculated from the spectral domain autocorrelation of the test fiber Rayleigh scatter can be combined with a spectral domain cross-correlation to simultaneously measure temperature and strain. See for example U.S. Pat. No. 7,538,883 incorporated here by reference.

What is needed is an approach to measure fiber birefringence amplitude and orientation in a distributed fashion with high spatial resolution, fidelity, and sensitivity, without a requirement to actively align the polarization state of input light launched into the optical device under test.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its purpose is to present some concepts of the innovation in a simplified form as a prelude to the more detailed description that is presented later.

The technology described in this application improves OFDR-based measurements of birefringence in waveguides and better characterizes local birefringence. The polarization state of input light launched into an optical fiber from an OFDR instrument is manipulated, and polarization diverse detection is used by the OFDR instrument to capture the complete polarization response of the reflected Rayleigh scatter pattern from the fiber, without a requirement to align the input light launched into the waveguide into a particular state. The Rayleigh scatter is then represented by a 2×2 matrix obtained using two input light launched polarization states and two received polarization states from the waveguide under test. The spectral autocorrelation of a polarization state averaged Rayleigh scatter pattern generated from the 4 matrix elements reliably results in a center peak and side band pattern with consistently strong side bands, regardless of the birefringence axis orientation in the waveguide under test. The birefringence is determined by the side band separation. Alternatively, a single shifted correlation peak is obtained by rotating and separating the 2×2 spectral domain matrix into fast and slow eigenvectors, and cross correlating fast and slow eigenvector data. Because the single cross-correlation peak is stronger than the autocorrelation side bands, and there is no central peak to obscure a correlation peak with a small spectral shift, measurement of the waveguide's birefringence is achieved with improved fidelity and sensitivity. Additionally, the process of separating the fast and slow eigenvectors results in a measurement of the birefringence axis orientation. These improvements in distributed birefringence measurements have application in a wide range of distributed sensing capabilities, including improved ability to discriminate between temperature and strain, and the measurement of pressure, electrical current, bend curvature, and transverse strain sensing.

Example embodiments include a method for determining birefringence of a waveguide segment at a particular location along the waveguide, where the waveguide has a first index of refraction for a first polarization state and a second, different index of refraction for a second polarization state that is substantially orthogonal to the first polarization state. Light with a first polarization state is coupled into the waveguide, and a polarization diverse receiver detects first polarization state back scatter reflections associated with the waveguide segment and generates first polarization state back scatter data associated with the detected first polarization state back scatter reflections. Light with a second polarization state is also coupled into the waveguide, and a polarization diverse receiver detects second polarization state back scatter reflections associated with the waveguide segment and generates second polarization state back scatter data associated with the detected second polarization state back scatter reflections. A spectral response is determined based on the first polarization state back scatter data and the second polarization state back scatter data. A correlation is computed based on the spectral response, and the birefringence of the waveguide segment at the particular location along the waveguide is determined based on the correlation. The determined birefringence is used to characterize the waveguide segment.

Example embodiments form a matrix based on the first polarization state back scatter data and the second polarization state back scatter data, and compute a spectral response for each component of the matrix. A spectral amplitude function is computed based on the spectral responses computed for components and an autocorrelation of the spectral amplitude function is then calculated. A spectral shift is determined from a main autocorrelation peak to a side autocorrelation peak. The spectral shift corresponds to the birefringence of the waveguide segment at the particular location along the waveguide. The matrix is a 2×2 matrix having four matrix components, and the four matrix components are combined, and a combined spectral amplitude function is determined from the combined four matrix components. The autocorrelation of the combined spectral amplitude function is calculated.

In other example embodiments, the matrix is a 2×2 matrix having two 1×2 vectors, and the 2×2 matrix is rotated until one of the rotated 1×2 vectors represents light polarized in the fast polarization mode and the other of the rotated 1×2 vectors represents light polarized in the slow polarization mode. The one or more rotation angles associated with the rotating of the 2×2 matrix may be stored in memory and used to characterize the waveguide segment. The one rotated 1×2 vector is combined with the other rotated 1×2 vector to produce a combined result, and a fast spectral amplitude function and a slow spectral amplitude function are computed based on the combined result. A cross-correlation of the fast spectral amplitude function and the slow spectral amplitude function is computed. A spectral shift of a cross-correlation peak from zero is determined, and the birefringence of the waveguide segment at the particular location along the waveguide is determined based on the spectral shift.

A birefringence value for each of multiple waveguide segments along the waveguide may be determined. The birefringence values for the multiple waveguide segments are combined to form a birefringence distribution over the length of the waveguide.

Example applications include one or more of determining strain or temperature, discriminating between strain and temperature, determining local curvature or bending of the waveguide, determining pressure, determining strain applied in a direction perpendicular to the axis of the waveguide, or determining magnetic or electric field strength based on the determined birefringence.

Example embodiments include an optical apparatus that includes a light source to couple light with a first polarization state into the waveguide and to couple light with a second polarization state into the waveguide. The second polarization state is substantially orthogonal to the first polarization state. Optical detection circuitry detects first polarization state back scatter reflections associated with the waveguide segment and generates first polarization state back scatter data associated with the detected first polarization state back scatter reflections. It also detects second polarization state back scatter reflections associated with the waveguide segment and generates second polarization state back scatter data associated with the detected second polarization state back scatter reflections. Processing circuitry determines a spectral response based on the first polarization state back scatter data and the second polarization state back scatter data, computes a correlation based on the spectral response, determines the birefringence of the waveguide segment at the particular location along the waveguide based on the correlation, and uses the determined birefringence to characterize the waveguide segment.

Example implementations of the optical apparatus include a network that comprises a launch conditioning network, coupled to the light source, including a first light path and a second light path, where the second light path is delayed with respect to the first light path, and a polarization controller to ensure light in the first path is substantially orthogonal to light in the second path. A measurement interferometer combines the light from first and second paths in the launch conditioning network with light reflected from the waveguide. The optical detection circuitry includes a polarization diverse receiver, coupled to the measurement interferometer, to separately detect the first polarization state back scatter data and the second polarization state back scatter data.

Other example implementations of the optical apparatus include a network that couples light with the first polarization state into the waveguide during a first time period and light with the second polarization state into the waveguide during a second time period. A polarization controller switches between two orthogonal polarization launch states for the first and second time periods. A measurement interferometer combines the light from the polarization controller with light reflected from the waveguide. The optical detection circuitry includes a polarization diverse receiver, coupled to the measurement interferometer, to separately detect the first polarization state back scatter data and the second polarization state back scatter data.

Example embodiments include an optical apparatus that determines polarization mode dispersion for a waveguide segment at a particular location along the waveguide. A light source couples light with a first polarization state into the waveguide and to couple light with a second polarization state into the waveguide. The second polarization state is substantially orthogonal to the first polarization state. Optical detection circuitry detects first polarization state back scatter reflections associated with the waveguide segment and generates first polarization state back scatter data associated with the first polarization state back scatter reflections. It also detects second polarization state back scatter reflections associated with the waveguide segment and generate second polarization state back scatter data associated with the second polarization state back scatter reflections. Processing circuitry determines a time delay domain response based on the first polarization state back scatter data and the second polarization state back scatter data, computes a correlation based on the time delay domain response, determines the polarization mode dispersion of the waveguide segment at the particular location along the waveguide based on the correlation, and uses the determined polarization mode dispersion to characterize the waveguide segment.

In an example implementation, the time delay domain response is a time domain polarization state averaged amplitude function, and the correlation is an autocorrelation. The processing circuitry determines the time delay associated with the polarization mode dispersion based on a separation between a center peak and a side band resulting from the autocorrelation.

In another example implementation, the time delay domain response is a time domain transfer function, and the correlation is a cross-correlation. The processing circuitry determines the time delay associated with the polarization mode dispersion based on a separation between zero and a side band resulting from the cross-correlation.

DETAILED DESCRIPTION

In the following description, for purposes of explanation, numerous specific details are set forth in order to provide a thorough understanding of the subject innovation. It may be evident, however, that the innovation can be practiced without these specific details. Certain illustrative aspects of the innovation are described herein in connection with the following description and the drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

The description applies to optical waveguides. An example optical waveguide is an optical fiber. The following description refers to optical fibers for ease of description; however, it should be understood that this description applies to optical waveguides in general.

Instruments based on OFDR are very useful for a wide range of applications because of the capability to return reflection data with very high spatial resolution (e.g., 0.01-1 mm) over useful ranges in optical fiber (e.g., 30-2000 m) with a noise floor well below the fiber Rayleigh scatter level. Similar to instruments based on Optical Time Domain Reflectometry (OTDR) or Optical Coherence Domain Reflectometry (OCDR), an OFDR instrument can measure the Return Loss (RL) of events in the fiber path vs. distance, and if the Rayleigh scatter of the fiber or waveguide is visible, to make distributed Insertion Loss (IL) measurements. In addition, the reflectivity data in the time delay domain is complex, and that data may be sub-sectioned or segmented and subjected to a Fourier transform to obtain the spectral domain response for a segment of data. This segmented or local spectral data is useful in making spectral Return Loss and Insertion Loss measurements, but also in making spectral shift measurements of the Rayleigh scatter, which can be used to measure distributed strain, temperature, and/or birefringence. If the full polarization response information of the test path is also recorded, then Polarization Mode Dispersion (PMD) and Polarization Dependent Loss (PML) measurements for strongly reflecting events (reflectivity above that of Rayleigh scatter) and/or polarization cross-over events in polarization maintaining (PM) fiber due to transverse stress may also be determined.

Figure 1:
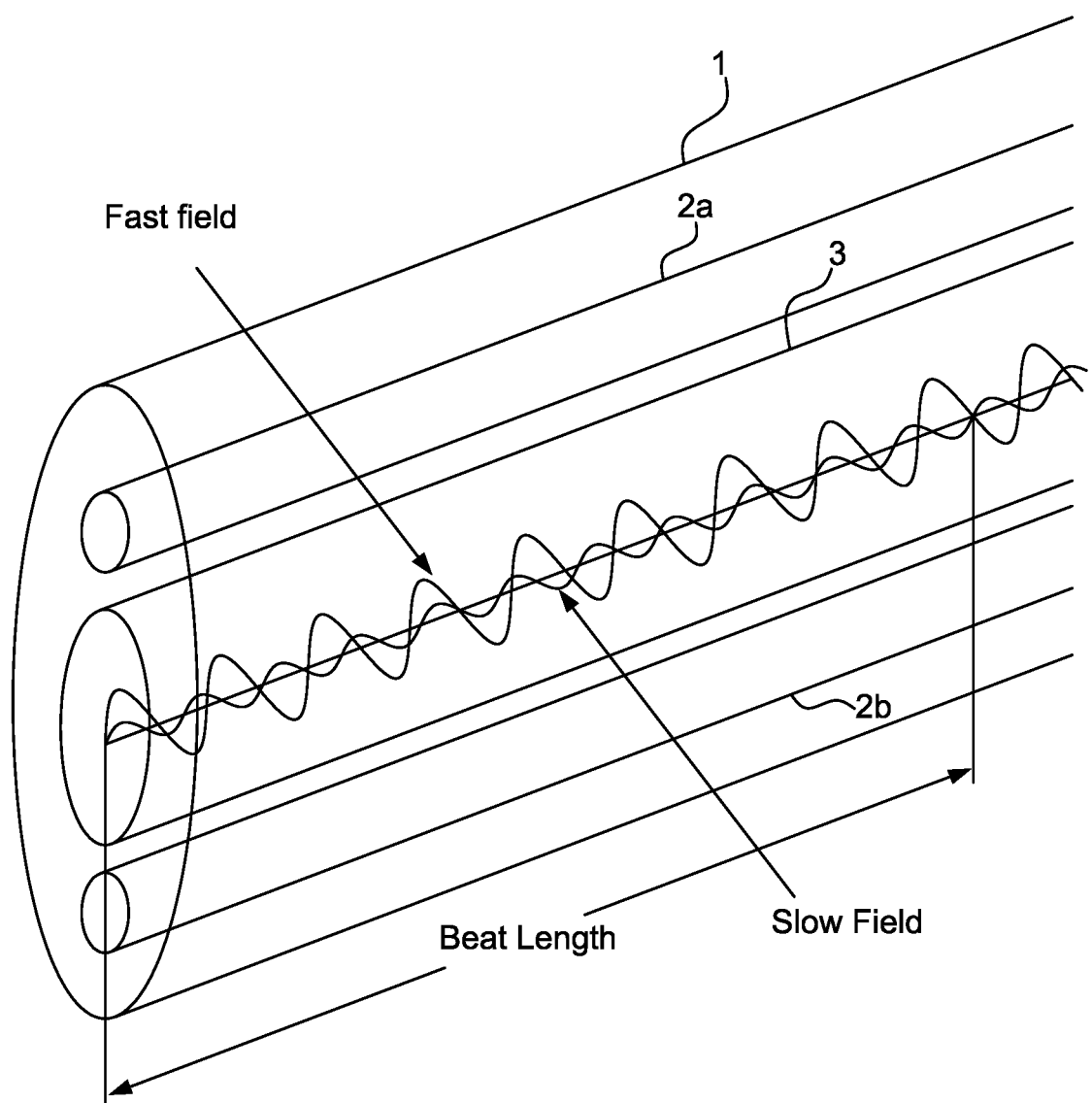
FIG. 1 illustrates the structure of polarization maintaining optical fiber and the resulting slow and fast field response due to birefringence.
Figure 2:
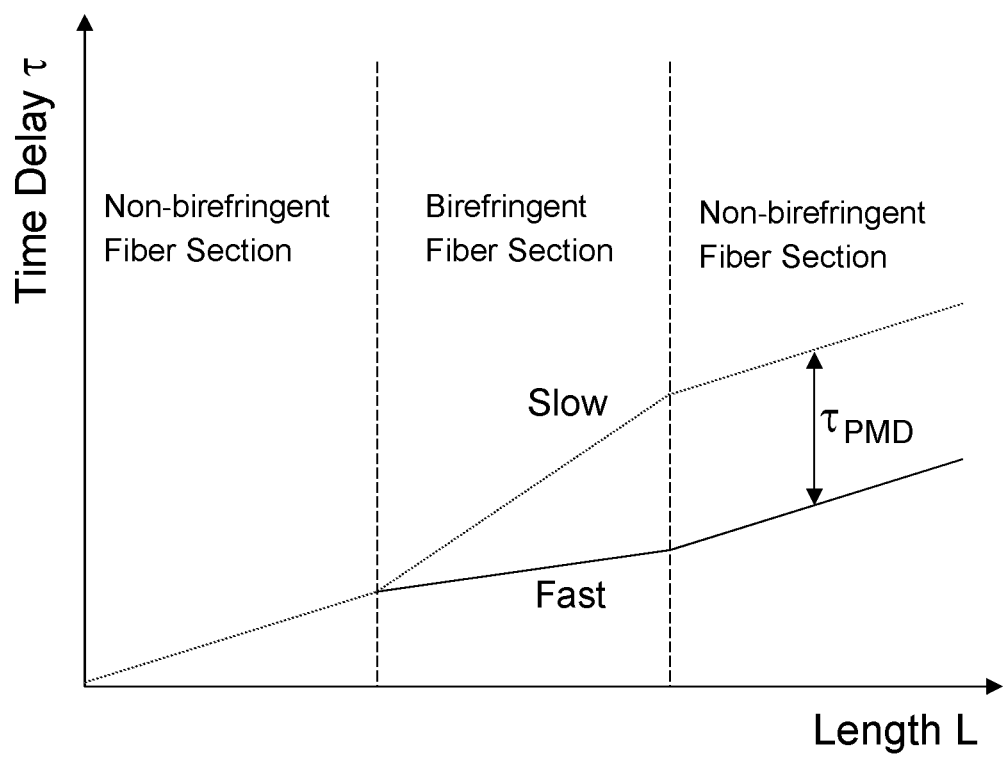
FIG. 2 is a graph which shows the relationship between time-of-flight delay in an optical fiber and the fast and slow group index of refraction, and how birefringence leads to Polarization Mode Dispersion.
Figure 3:
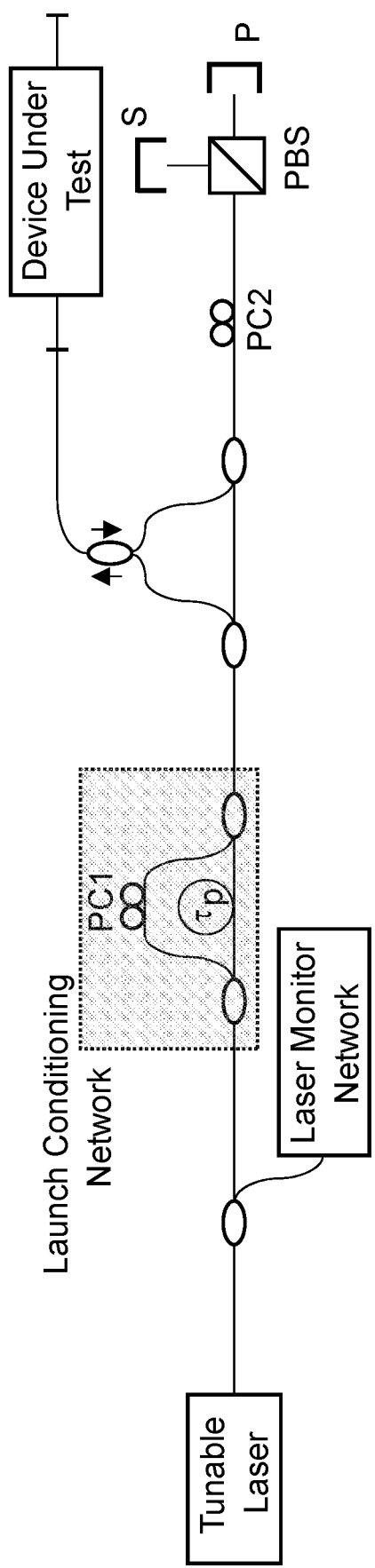
FIG. 3 is an example of an OFDR instrument optical network for testing devices in reflection which launches two polarization states with a time delay in between to the Device Under Test.

In a first example implementation, referred to as the single scan dual delayed polarization state launch technique, an OFDR-based commercial instrument, the Luna Optical Vector Analyzer (OVA), measures the complete optical transfer function of a device under test (DUT), including polarization dependent amplitude and phase information. An example OVA optical network is shown in FIG. 3 which specifically includes a launch conditioning network that produces polarization diverse launch and detection states. After a portion of the tunable laser's light is tapped to monitor the laser optical frequency using the laser monitor network, the launch conditioning network splits the light into two paths, one delayed with respect to the other by $\tau_p$, and a polarization controller (PC1) is used to ensure light in the two paths is orthogonal to each other. These two orthogonal light states are recombined and directed to a measurement interferometer, in which light reflecting from the DUT is combined with light from the interferometer reference path. Light from the measurement interferometer enters a polarization diverse receiver portion of the network, where it passes through a polarization controller PC2 and polarizing beam splitter (PBS), and into two light detectors S and P. PC2 is used to ensure that light travelling through the interferometer reference path is equally represented at both detectors S and P. Used in this manner, PC2, the PBS, and the S and P detectors constitute what is known as a polarization diverse receiver. As the laser is tuned through a range of optical frequencies, interference fringes are recorded at detectors S and P. Ideally, the laser is tuned so that the optical frequency varies linearly with time, so that detector signals sampled in equal increments of time are also in equal increments of optical frequency. However, in practice, laser tuning nonlinearities are monitored in the Laser Monitor Network (which typically consists of gas absorption cell and one or more interferometers) and compensated for either by adjusting the timing of the sampling, or by resampling the detector data.

Figure 4:
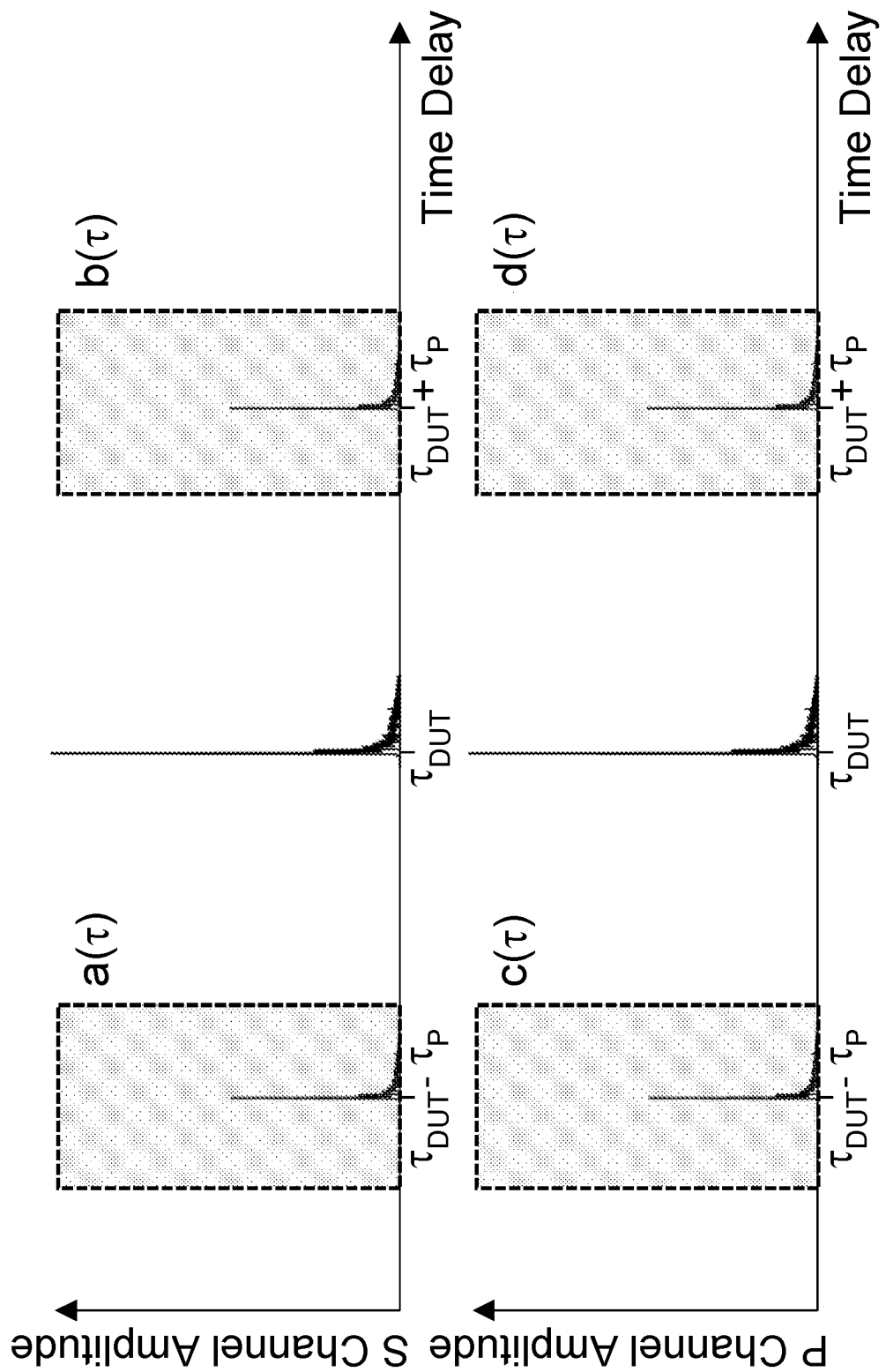
FIG. 4 illustrates the time delay domain windowing of the device response to obtain 4 transfer matrix elements for the optical network in FIG. 3.

The S and P interference patterns, collected as a function of optical frequency, are subjected to a Fast Fourier Transform (FFT) to transform the interference data into the time delay domain. Because of the launch conditioning network, each reflection event in the DUT is represented in FIG. 4 by four delayed events in the time delay domain in response to two orthogonal and delay launch states that traverse both reference and test paths of the interferometer. Two of the four events overlap and occur at $\tau_{DUT}$, and the other two occur at $\tau_{DUT}-\tau_P$ and $\tau_{DUT}+\tau_P$. Further, there are two sets of these events, for each of the two orthogonal detection states S and P. The four non-degenerate copies of the reflection event response in the time delay domain can be windowed (shown with dashed lines in FIG. 4) and used to form the four elements of the Jones transfer matrix of the DUT. The time domain elements of the Jones Matrix can then be subjected to an inverse FFT to obtain the spectral domain version of the Jones Matrix:

$$\mathcal{H}(\tau) = \begin{pmatrix} a(\tau) & b(t) \\ c(\tau) & d(\tau) \end{pmatrix}, \quad (6\ a, b)$$

$$H(v) = iFFT(\mathcal{H}(\tau)) = \begin{pmatrix} a(v) & b(v) \\ c(v) & d(v) \end{pmatrix}$$

Because this OFDR approach to measuring the Jones Matrix is capable of measuring both the optical amplitude and phase response over the full tuning range of the laser, and contains the full polarization response, this transfer matrix can be used to calculate standard linear optical response DUT properties: return loss, polarization dependent loss, group delay, chromatic dispersion, polarization mode dispersion, etc.

The Principle States method is used to calculate time delay associated with polarization mode dispersion ($\tau_{PMD}$) from the spectral transfer matrix H(v):

$$\tau_{PMD} = \left| \frac{\angle(\rho_1/\rho_2)}{2\pi \Delta v} \right|, \quad (7)$$

where $\rho_1$ and $\rho_2$ are the eigenvalues of $H_{j+1} H_j^{-1}$.

In the above expression, the ∠ operator indicates to take the phase argument of the complex term, and the j and j+1 subscripts indicate adjacent spectral index values of the transfer matrix separated by an optical frequency step of Δv.

The single scan dual delayed polarization state launch technique described above with reference to the examples shown in FIGS. 3 and 4 has the advantage that response to orthogonal states is essentially acquired simultaneously with a single laser optical frequency sweep. Compared to measurement techniques that require separate laser sweeps for different polarization launch states, this technique is not susceptible to measurement error caused by drift in the test device properties in the period in between sweeps. However, the use of the launch conditioning network to create a delay between two polarization input launch states effectively limits the extent of the device under test time impulse response. Thus, to effectively use this single scan dual delayed polarization state launch technique to measure distributed birefringence in fiber, the delay between the orthogonal launch states must be longer than the delay associated with the test fiber, and breaking up the delay domain into two sections corresponding to the two polarization states effectively reduces the test device length range by at least a factor of 2. Furthermore, the PMD measurement described in Equation 7 is designed to work on a coherent time impulse response, meaning that the transfer matrix element phase is a smooth, continuous function of optical spectrum—but this is not generally true for Rayleigh scatter.

Figure 5:
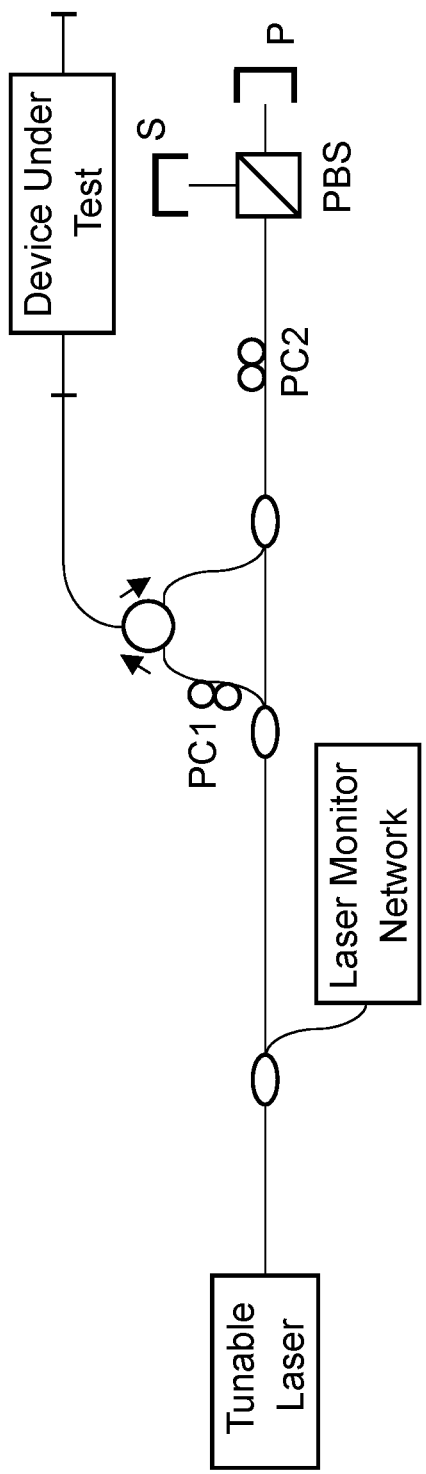
FIG. 5 is an example of an OFDR instrument optical network for testing devices in reflection which launches a single but modifiable polarization state to the Device Under Test.
Figure 6:
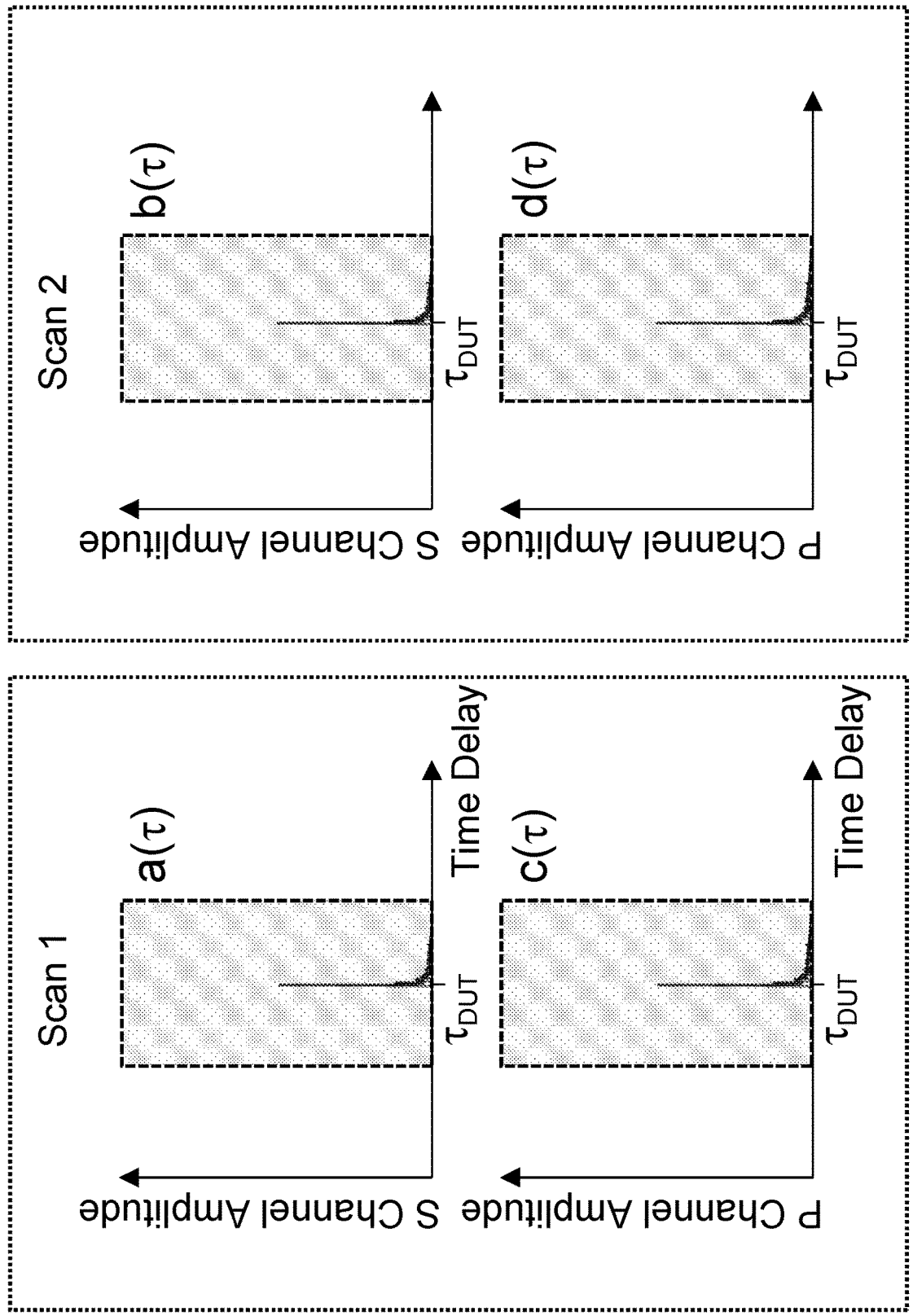
FIG. 6 illustrates the time delay domain windowing of the device response to obtain 4 transfer matrix elements for the optical network in FIG. 5.

Another example implementation based on a two scan switched polarization state launch technique is now described. FIG. 5 shows an example of an OFDR instrument optical network for testing devices in reflection which launches a single but modifiable polarization state to the Device Under Test (DUT). This network is similar to that of the network shown in FIG. 5, but it does not contain a polarization conditioning network labeled as the launch conditioning network in FIG. 3. Light from the tunable laser enters the test device measurement interferometer in a single polarization state. A polarization controller PC1 can be located either inside the instrument network as depicted in FIG. 5, or anywhere along the path between the laser and the DUT. For the purpose of monitoring distributed birefringence, this polarization controller PC1 may be used to adjust the polarization state at the test fiber so that both fast and slow states of the test fiber are illuminated approximately equally. In this example implementation, the polarization controller PC1 switches between two orthogonal polarization launch states in subsequent device scans, as depicted in FIG. 6. The polarization controller PC1 may also be described as a polarization switch since only two discrete states are required.

Figure 11:
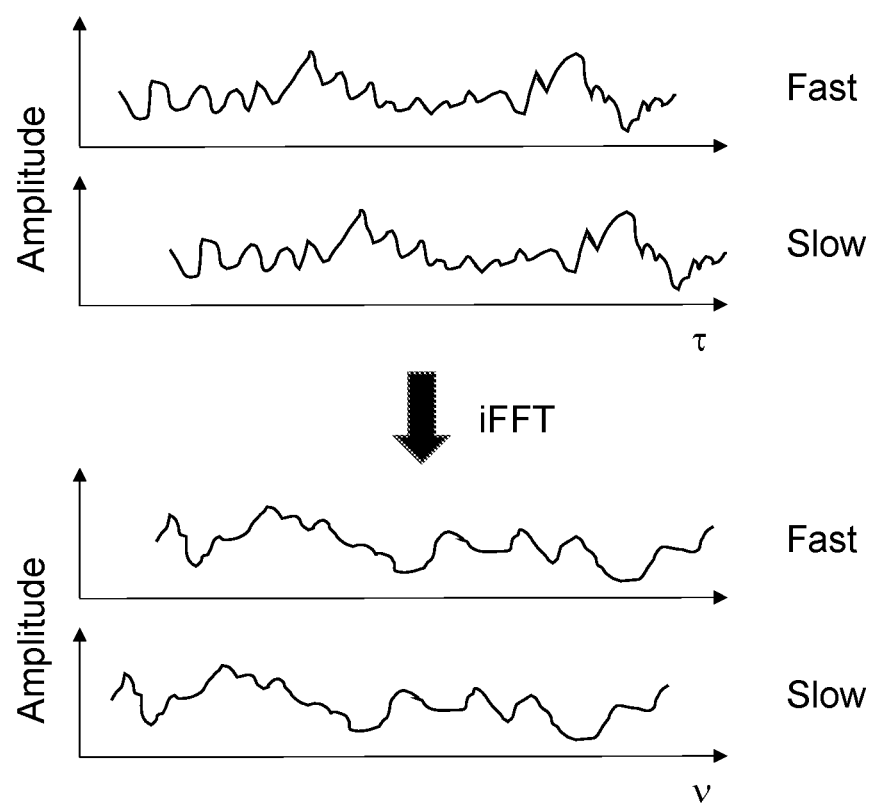
FIG. 11 illustrates the existence of substantially identical but shifted versions of the Rayleigh scatter reflection amplitude profile for a segment of the waveguide in the time delay domain and spectral domain.

If there is significant spatial overlap between the fast and slow modes in a defined segment of Rayleigh scatter in the time domain, then a significant portion of the Rayleigh scatter pattern should be shared between the modes but shifted in the time delay and spectral domains. An example in FIG. 11 illustrates the existence of substantially identical but shifted versions of the Rayleigh scatter reflection amplitude profile for a segment of the waveguide in the time delay domain and spectral domain.

Figure 12:
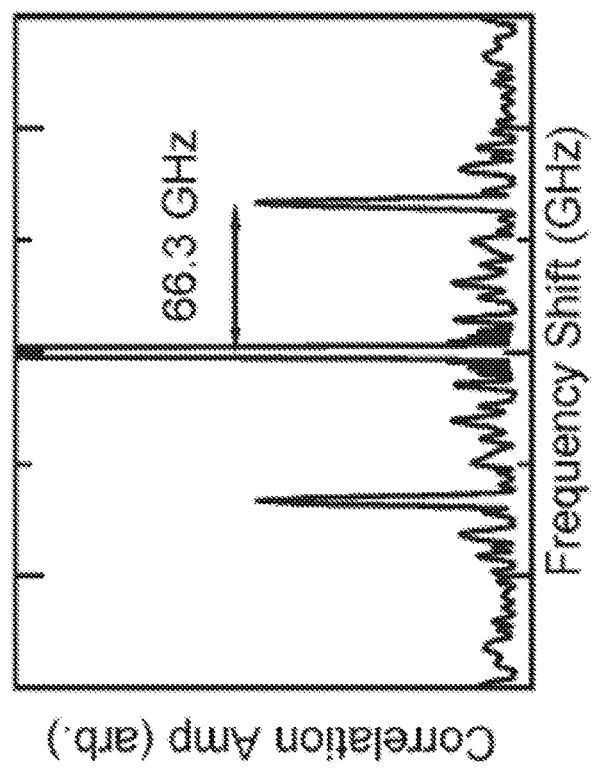
FIG. 12 shows examples of time delay domain and spectral domain autocorrelation side bands stemming from test waveguide birefringence.
Figure 12:
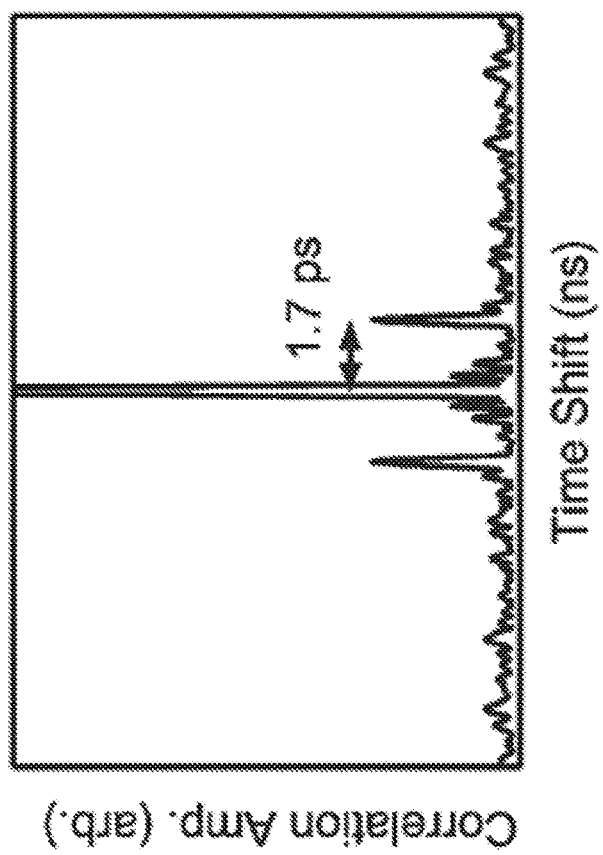

FIG. 12 shows examples of time delay domain and spectral domain autocorrelation side bands stemming from test waveguide birefringence. As seen in FIG. 12, an autocorrelation of a time domain segment of the Rayleigh scatter pattern results in three correlation peaks: a large center peak at 0 delay and two side peaks shifted in the positive and negative directions by the accumulated $\tau_{PMD}$. An autocorrelation of a segment of the Rayleigh scatter that is transformed to the spectral domain results in a similar pattern, with side bands shifted in optical frequency $\Delta v_B$ proportionally to the local difference between the slow and fast group indices $n_s - n_f$.

The OFDR reflectometer network depicted in FIG. 5 sequentially scans (e.g., Scan 1 and Scan 2 in FIG. 6) the test fiber's response to orthogonal polarization launch states, and a reflection event or scatter segment is windowed, (see the windowing example for Scan 1 and Scan 2 depicted in FIG. 6), to form a Jones transfer matrix. The two scan switched polarization state launch technique effectively produces the same result as for the single scan dual delayed polarization state launch technique.

The Jones transfer matrix gives a complete representation of the test device in the sense that it can be used to generate a simulated Jones vector response for any possible input polarization state. Thus, having obtained the spectral Jones transfer matrix H(v'), it is possible to generate the test device response as if the polarization state had been selected to equally illuminate both slow and fast axes, or to generate the test device response as if the polarization state illuminated only the fast or slow axis. Using the Jones transfer matrix in this manner assumes there is not significant polarization dependent loss in the path to any portion of the birefringent waveguide. In an extreme case of polarization dependent loss, one polarization state is completely blocked, and if the blocked state corresponded to either the fast or slow birefringence axes, reconstructing the birefringence or polarization mode dispersion would not be possible.

When computing a spectral shift of side bands in the autocorrelation of the scatter from a birefringent waveguide, the magnitude of the side band correlation peaks relative to the center peak are maximized when the responses from both fast and slow axes are equal. This condition is achieved by equally weighting all 4 components of the transfer function Jones transfer matrix H(v) to assure equal representation of both fast and slow Rayleigh scatter pattern components. To compute a spectral autocorrelation showing sideband peaks as in FIG. 12, the full time delay domain transfer matrix $\mathcal{H}(\tau)$ is divided into segments, where $\mathcal{H}_i(\tau)$ is the time delay transfer matrix of the $i^{th}$ segment, and is subjected to a Fourier Transform to generate the segment spectral domain transfer matrix $H_i(v)$. The polarization state averaged spectral amplitude function $A_i(v)$ is computed from the complex terms of $H_i(v)$:

$$A_i(v) = \sqrt{|a_i(v)|^2 + |b_i(v)|^2 + |c_i(v)|^2 + |d_i(v)|^2} \tag{8}$$

The polarization state averaged autocorrelation is computed as follows:

$$A_i(v) * A_i(v) = i\text{FFT}\{\text{FFT}(A_i(v))\text{FFT}(A_i(v))^*\} \tag{9}$$

A direct, non-circular, autocorrelation calculation may alternatively be used instead of the FFT autocorrelation described in Equation 9. The spectral shift between the center peak and side band of the polarization state averaged autocorrelation result is converted to the segment birefringence using Equation 4. This process is repeated for time domain segments i=1 to N to form the birefringence distribution for the device under test. This process is summarized in FIG. 7, with a more detailed process provided in FIG. 8.

Figure 7:
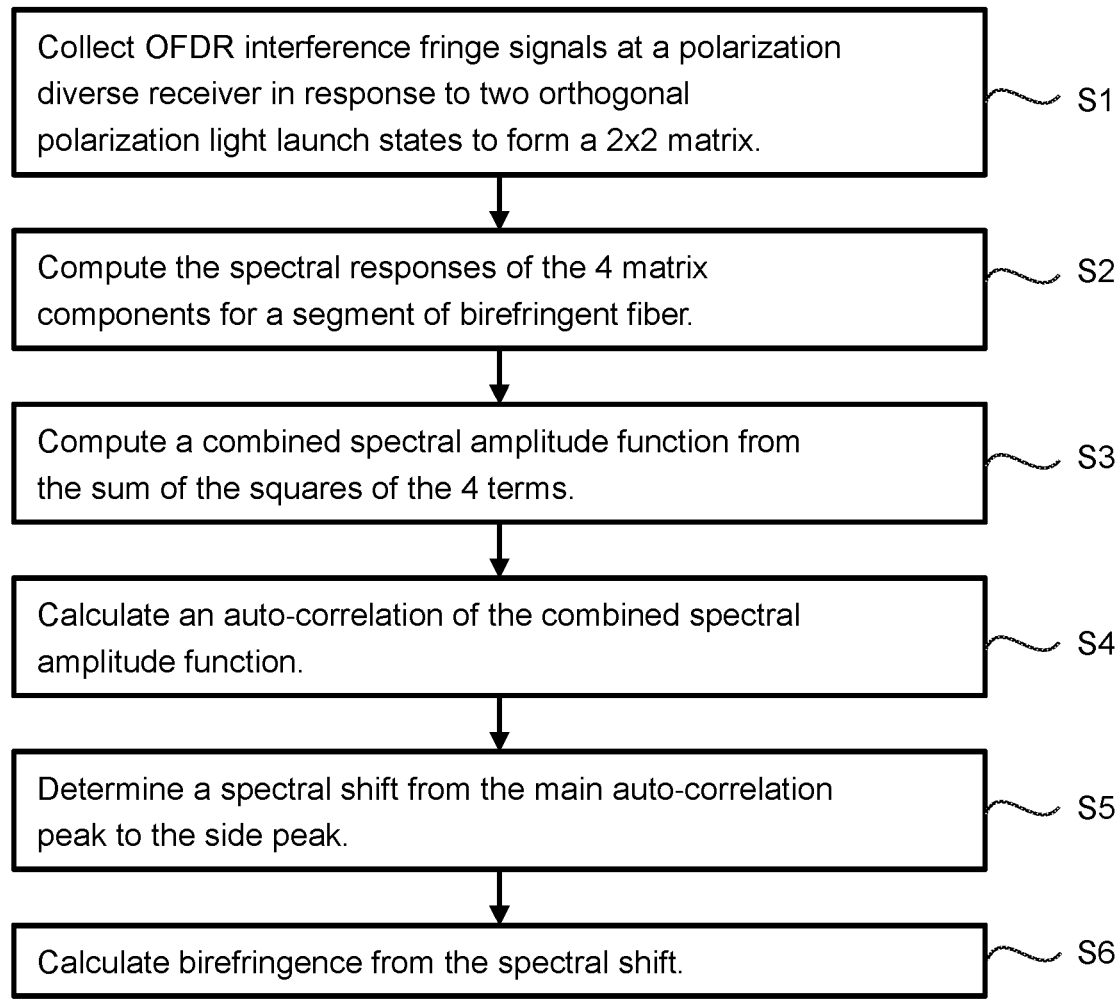
FIG. 7 is a flow chart illustrating example steps for determining birefringence at a particular location in the waveguide under test using an autocorrelation of the spectral response function generated from the 4 terms of the device transfer matrix.

FIG. 7 is a flow chart illustrating example steps for determining birefringence at a particular location in the waveguide under test using an autocorrelation of the spectral response function generated from the 4 terms of the device transfer matrix. In step S1, the OFDR instrument collects OFDR interference fringe signals at the polarization diverse receiver in response to two orthogonal polarization light launch states from the tunable laser to form a 2×2 matrix. The spectral responses of the 4 matrix components are computed for a segment of birefringent fiber (step S2). A combined spectral amplitude function is computed from the sum of the squares of the 4 terms (step S3). An autocorrelation is calculated of the combined spectral amplitude function (step S4). A spectral shift is determined from the main autocorrelation peak to the side peak (step S5), and birefringence is calculated from the spectral shift (step S6).

Figure 8:
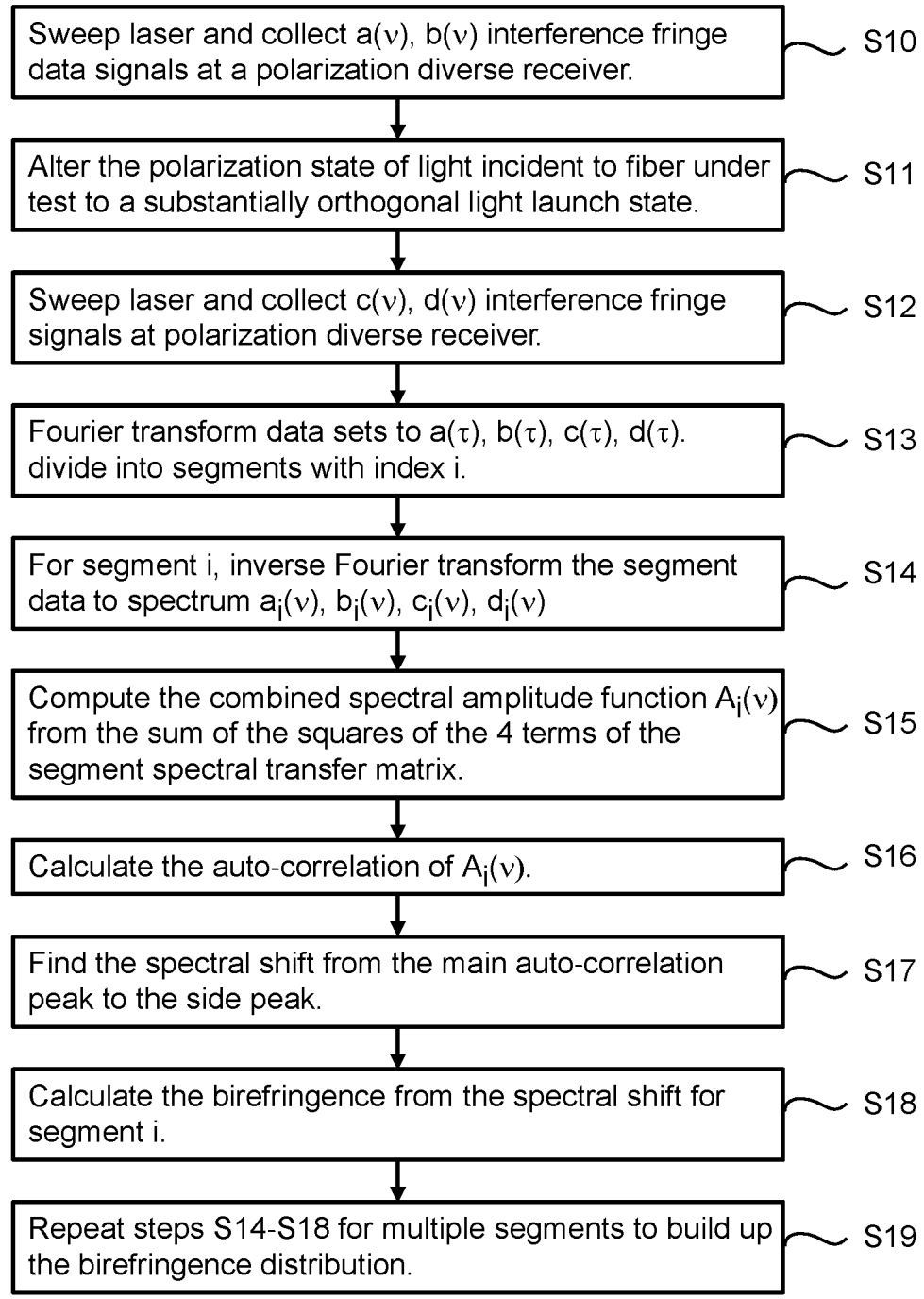
FIG. 8 is a flow chart illustrating more detailed but still example steps for determining the distributed birefringence of a waveguide using an autocorrelation of the spectral response function generated from the 4 terms of the device transfer matrix.

FIG. 8 is a flow chart illustrating more detailed but still example steps for determining the distributed birefringence of a waveguide using an autocorrelation of the spectral response function generated from the 4 terms of the device transfer matrix. At step S10, the laser is swept to collect a(v), b(v) interference fringe data signals at a polarization diverse receiver. The polarization state of light incident to fiber under test is altered to a substantially orthogonal light launch state (step S11). The laser is swept again to collect c(v), d(v) interference fringe signals at polarization diverse receiver (step S12). The data sets a(v), b(v), c(v), d(v) are Fourier transformed to a(τ), b(τ), c(τ), d(τ) and divided into segments with index i (step S13). For segment i, the segment data is inverse Fourier transformed to spectrum $a_i(v)$, $b_i(v)$, $c_i(v)$, $d_i(v)$ (step S14). The combined spectral amplitude function $A_i(v)$ is computed from the sum of the squares of the 4 terms of the segment spectral transfer matrix (step S15). The autocorrelation of $A_i(v)$ is calculated (step S16), the spectral shift from the main autocorrelation peak to the side peak is determined (step S17), and the birefringence from the spectral shift for segment i is calculated (step S18). Steps S14-S18 are repeated for multiple segments to build up the birefringence distribution.

In a similar fashion, the spatial distribution of the Differential Group Delay $\tau_{PMD}$ can be obtained by computing a time domain polarization state averaged amplitude function from $\mathcal{H}_i(\tau)$, computing the segment time domain autocorrelation, calculating $\tau_{PMD}$ from the separation between the center peak and the side band, and accumulating the results for each segment.

Regardless of whether the transfer matrix H(v) is generated using the single scan dual delayed polarization state launch technique or the two scan switched polarization state launch technique, computing the autocorrelation as described above has a significant advantage: the side band strength is optimized regardless of the orientation of the birefringence relative to the orientation of the polarization launch states. Thus, no special alignment is needed to insure that the fast and slow states are equally populated.

In other example embodiments, the Rayleigh scatter pattern spectral signatures corresponding to the fast and slow axes of the birefringent waveguide may be mathematically identified and isolated from H(v) in the form of orthogonal eigenvectors of the 2×2 matrix. Amplitude functions generated from the fast and slow eigenvectors are cross-correlated to determine the optical frequency shift associated with the local birefringence. This orthogonal vector cross-correlation embodiment avoids a large correlation peak at zero frequency shift that is present in the polarization state averaged autocorrelation embodiment. The signal to noise ratio of the spectral shift measurement is improved because the cross-correlation peak is larger than the autocorrelation side band relative to the noise floor. Further, smaller spectral shifts can be measured, because of the lack of a large autocorrelation peak at zero frequency that might otherwise obscure the frequency shifted correlation peak.

Figure 9:
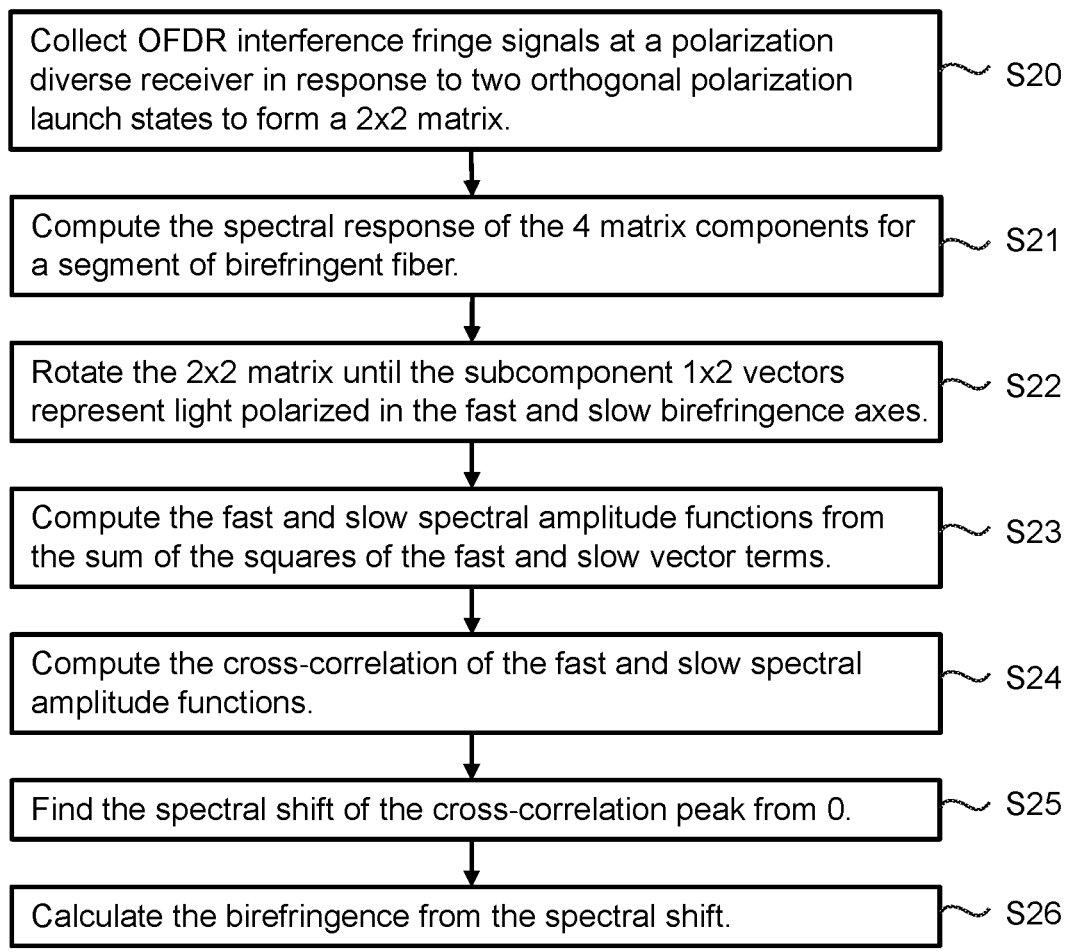
FIG. 9 is a flow chart illustrating example steps for determining birefringence at a particular location in the waveguide under test using a cross-correlation of the spectral response functions generated from the fast and slow terms of the device transfer matrix.

Example cross-correlation methods are now described. FIG. 9 is a flow chart illustrating example steps for determining birefringence at a particular location in the waveguide under test using a cross-correlation of the spectral response functions generated from the fast and slow terms of the device transfer matrix. OFDR interference fringe signals are collected at a polarization diverse receiver in response to two orthogonal polarization launch states to form a 2×2 matrix (step S20). The spectral response of the 4 matrix components is computed for a segment of birefringent fiber (step S21). The 2×2 matrix is rotated until the subcomponent 1×2 vectors represent light polarized in the fast and slow birefringence axes (step S22). The fast and slow spectral amplitude functions are computed from the sum of the squares of the fast and slow vector terms (step S23). The cross-correlation of the fast and slow spectral amplitude functions is determined (step S24). The spectral shift of the cross-correlation peak from 0 is determined (step S25), and the birefringence is calculated from the spectral shift (step S26).

To isolate the Rayleigh scatter response of the fiber fast and slow axes efficiently, the eigen values/eigenvectors of a suitable matrix are computed based on the Principle States calculation in Equation 7. Because the amplitude and phase of the Rayleigh scatter pattern varies randomly with optical frequency, the Principle States decomposition cannot be used as in a standard PMD calculation. Instead, polarization rotation matrices are applied to the measured spectral transfer function, and orthogonal vectors of the spectral transfer matrix cross-correlated iteratively until the center peak is eliminated, and the side band peak is maximized.

As with the autocorrelation calculation, the full time delay domain transfer matrix $\mathcal{H}(\tau)$ is divided in to segments, where $\mathcal{H}_i(\tau)$ is the time delay transfer matrix of the $i^{th}$ segment, and an inverse FFT is used to obtain the segment spectral transfer function $H_i(v)$. The next step is to apply rotation matrices R and Φ to $H_i(v)$, where θ represents a linear state rotation and φ represents a rotation between linear and circular states on the Poincare sphere:

$$H'_i(v) = R\Phi H_i(v), \text{ with}$$ (10)

$$R = \begin{bmatrix} \cos\theta & \sin\theta \\ -\sin\theta & \cos\theta \end{bmatrix} \text{ and } \Phi = \begin{bmatrix} e^{i\phi/2} & 0 \\ 0 & e^{-i\phi/2} \end{bmatrix}$$

Next, orthogonal vectors of $H'_i(v)$ are formed by separating columns ($a'_i(v)$, $c'_i(v)$) and ($b'_i(v)$, $d'_i(v)$), and the combined spectral amplitude functions $B_i(v)$ and $C_i(v)$ are calculated for each vector:

$$B_i(v) = \sqrt{|a'_i(v)|^2 + |c'_i(v)|^2}, C_i(v) = \sqrt{|b'_i(v)|^2 + |d'_i(v)|^2}$$ (11)

Then, the orthogonal vector cross-correlation between the columns of $H'_i(v)$ is computed:

$$B_i(v) * C_i(v) = iFFT\{FFT(B_i(v))FFT(C_i(v))^*\}$$ (12)

To find optimal values for θ and φ, φ may be adjusted until the center peak disappeared below the noise floor, and θ may be adjusted until the positive side band reaches maximum amplitude and the negative side band disappears below the noise floor.

For the purpose of finding a good alignment of θ and φ, it may also be useful to observe the autocorrelation results for one of the two orthogonal vectors of H'(v'), which may be computed as:

$$B_i(v) * B_i(v) = iFFT\{FFT(B_i(v))FFT(B_i(v))^*\}$$ (13)

To find optimal values for θ and φ, both angles be adjusted until the center peak is maximized and the side bands disappear below the noise floor.

$H'_i(v)$ may be iteratively rotated in θ and φ until columns of the transfer matrix are aligned to the fast and slow axes, as revealed by the results of the orthogonal vector cross-correlation described in equation 12 and orthogonal vector autocorrelation described in Equation 13. When properly rotated, the orthogonal vector cross-correlation exhibits a single large peak with a shift from 0 in proportion to the local birefringence. The side band peaks of the orthogonal vector autocorrelation tend to disappear at optimal values for θ and φ.

Alternatively, a calculation similar to Principle States decomposition may be used to find optimal values for θ and φ, as in the standard PMD calculation described in Equation 7. The Principle states decomposition works well when the time domain form of the transfer matrix $\mathcal{H}_i(\tau)$ terms is coherent, or in another words, has a clearly defined time impulse response peak. The time domain response of Rayleigh scatter, however, is not coherent: it is random in amplitude and phase over the time delay domain window. The time domain Rayleigh scatter signature, however, does form coherent peak when a correlation is applied. Thus, if the matrix multiply in Equation 7 is replaced with a correlation calculation, the calculation can successfully find the rotation of H(v) that separates the eigenvectors, and the corresponding spectral eigenvalue calculation described in equation 7 will produce the temporal shift corresponding to the local time delay associated with PMD.

The spectral shift between zero and a side band peak of the orthogonal vector cross-correlation result described in Equation 12 is converted to the segment birefringence using Equation 4. This process is repeated for time domain segments i=1 to N to form the birefringence distribution for the birefringence waveguide under test. This process of steps, summarized in FIG. 9 described above, is outlined in more detail in FIG. 10.

Figure 10:
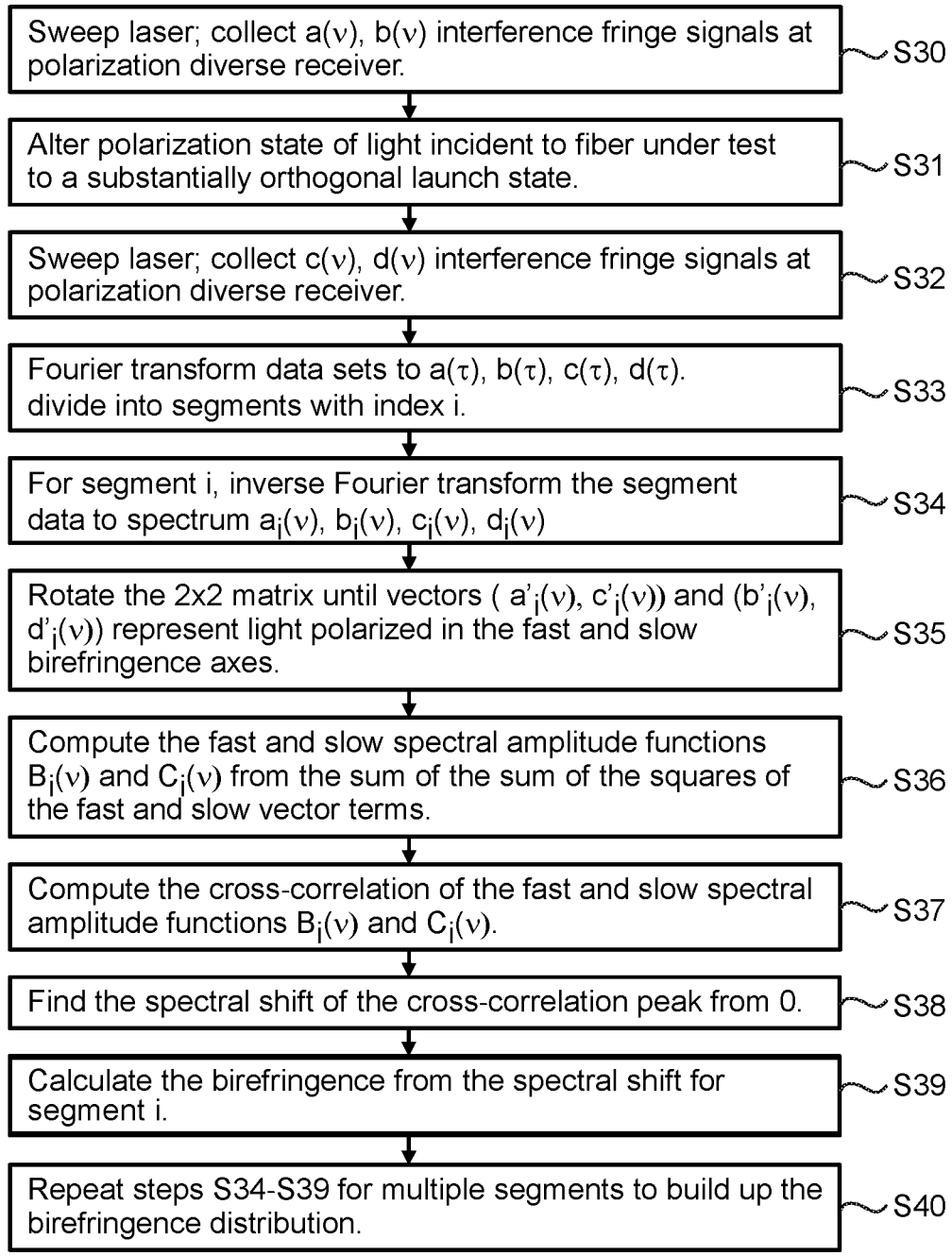
FIG. 10 is a flow chart illustrating more detailed but still example steps for determining the distributed birefringence of a waveguide using a cross-correlation of the spectral response functions generated from the fast and slow terms of the device transfer matrix.

FIG. 10 is a flow chart illustrates example steps for determining the distributed birefringence of a waveguide using a cross-correlation of the spectral response functions generated from the fast and slow terms of the device transfer matrix. At step S30, the laser is swept to collect a(v), b(v) interference fringe data signals at a polarization diverse receiver. The polarization state of light incident to fiber under test is altered to a substantially orthogonal light launch state (step S31). The laser is swept again to collect c(v), d(v) interference fringe signals at polarization diverse receiver (step S32). The data sets a(v), b(v), c(v), d(v) are Fourier transformed to a(τ), b(τ), c(τ), d(τ) and divided into segments with index i (step S33). For segment i, the segment data is inverse Fourier transformed to spectrum $a_i(v)$, $b_i(v)$, $c_i(v)$, $d_i(v)$ (step S34). The 2×2 matrix is rotated until vectors ($a'_i(v)$, $c'_i(v)$) and ($b'_i(v)$, $d'_i(v)$) represent light polarized in the fast and slow birefringence axes (step S35). The fast and slow spectral amplitude functions $B_i(v)$ and $C_i(v)$ are computed from the sum of the sum of the squares of the fast and slow vector terms (step S36). The cross-correlation of the fast and slow spectral amplitude functions $B_i(v)$ and $C_i(v)$ is computed (step S37). The spectral shift of the cross-correlation peak from 0 is determined (step S38), and the birefringence is calculated from the spectral shift for segment i (step S39). Steps S34-S39 are repeated for multiple segments to build up the birefringence distribution (step S40).

In a similar fashion, the spatial distribution of the Differential Group Delay $\tau_{PMD}$ can be obtained by obtaining a segment time domain transfer function $\mathcal{H}_i(\tau)$, rotating the matrix until the subcomponent vectors represent light polarized in the fast and slow birefringence axes, computing the fast and slow vector amplitude functions, computing the segment time domain cross-correlation between the fast and slow amplitude functions, calculating $\tau_{PMD}$ from the separation between zero and the side band, and accumulating the results for each segment.

While it is preferred that the two polarization states launched to the device under test are orthogonal in either the dual state delayed single scan launch technique or the switched state two scan launch example implementations technique, orthogonality is not required. The launch polarization states may be characterized in a calibration procedure, and a correction matrix calculated, so that imperfections in polarization state orthogonality may be corrected for mathematically. Also, increasing errors in the polarization state orthogonality only gradually degrade the quality of the birefringent measurements, so some level of error is generally tolerable. For example, polarization controllers that are designed to switch linear polarization states by 90° with a maximum error over a broad wavelength range of 5° are commercially available. Such an error, even uncorrected, has little impact on either the polarization state averaged autocorrelation technique or the orthogonal vector cross-correlation technique of determining the waveguide birefringence, because the correlation peaks would still be clearly defined, and the spectral shift of the correlation peaks would be unaffected.

Figure 13:
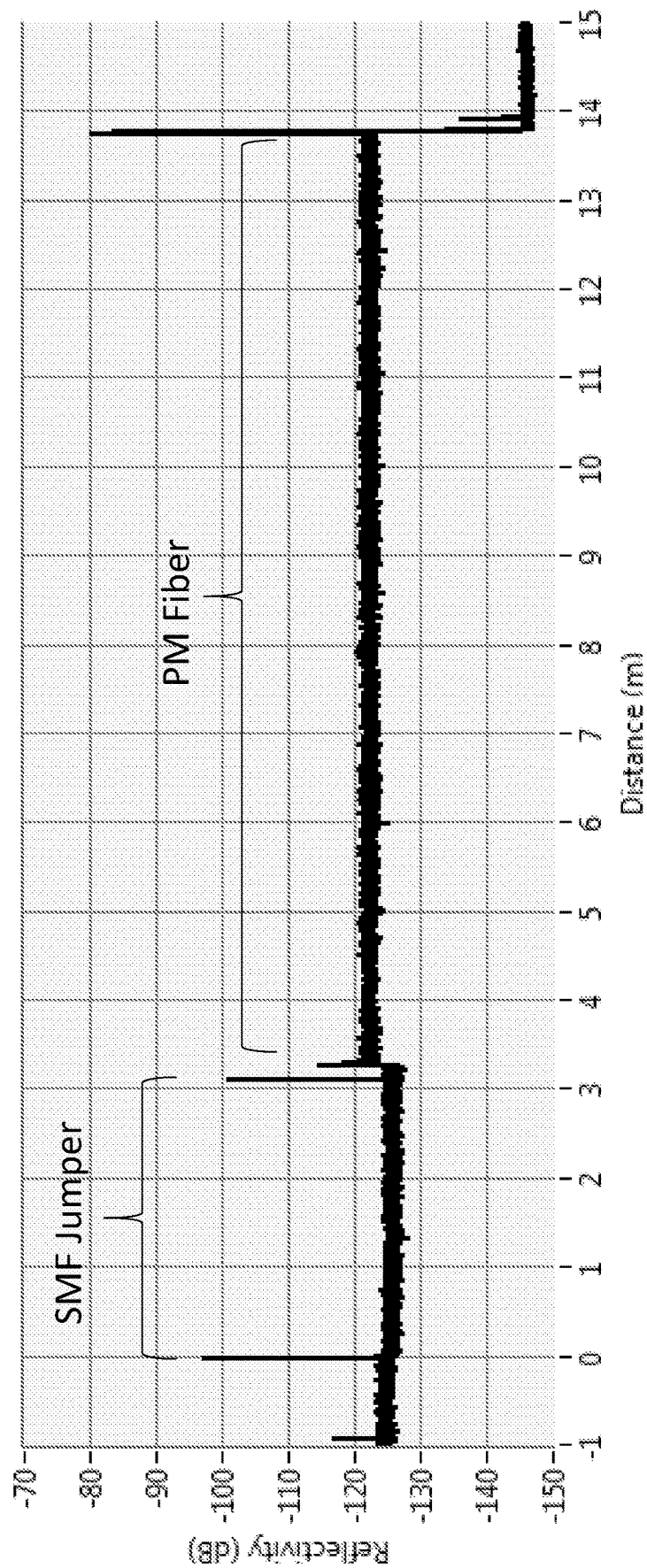
FIG. 13 shows an example OFDR instrument reflection amplitude vs. distance trace of a test device, with a PM fiber segment between 3.2 m and 13.8 m.

Example results collected from a PM test fiber for various matrix rotation values of θ are now described and illustrated. Data was collected using a Luna OBR 4600 modified to include a polarization controller that manipulated the polarization state at the test fiber, similar to the network depicted in FIG. 5. The test device included a 3.1 m single mode fiber (SMF) jumper that joins the instrument front panel to the test fiber connector, and a 10.6 m segment of gyroscope grade PM fiber spliced to a 0.2 m SMF pigtail and connector. The OBR wavelength scan range was set to 1530-1615.75 nm, which resulted in a 9.8 μm sample spacing along the length of the test fiber, using an assumed value for the group index of refraction of 1.4682. The test path was scanned twice in quick succession, with a 90° polarization state rotation introduced in between the scans. In this experiment polarization controller PC1 was adjusted so that the first scan illuminated only the fast axis of the PM fiber segment. FIG. 13 shows reflectivity vs. distance with a 10 mm spatial filter applied.

Figure 14:
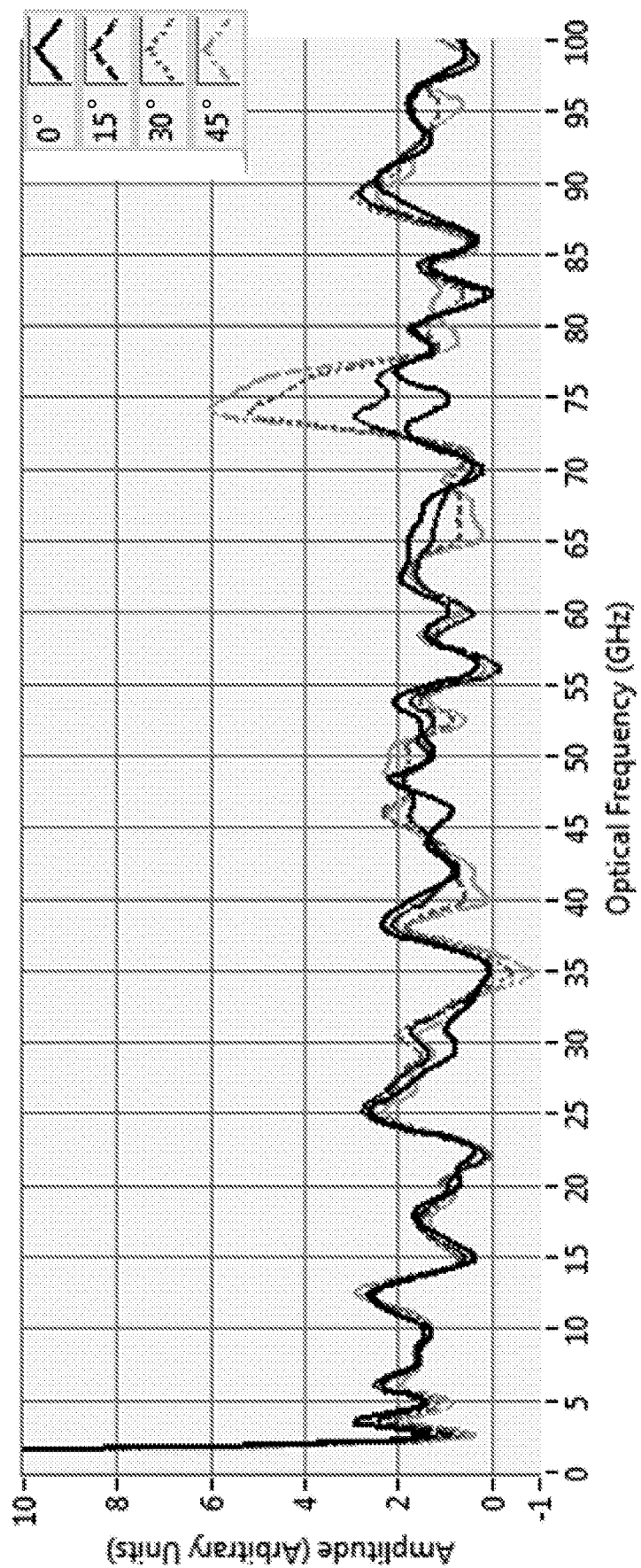
FIG. 14 shows plots of example autocorrelation results for a 1×2 vector of the transfer matrix for the reflection spectrums of a segment of Rayleigh scatter from a birefringent waveguide for four values of rotation angle θ, which demonstrates the sensitivity of the side band strength to the rotation angle.

The Rayleigh scatter data over a 10 m section between 3.5 and 13.5 m was divided into 4 cm segments, each with roughly 4082 sampled points in each section, and transformed into the spectral domain. To illustrate the effects of a linear state rotation in θ on the single vector autocorrelation and the orthogonal vector cross-correlation results described by Equations 12 and 13, data centered at 5.34 m was processed with various values for θ and plotted the results for each in FIGS. 14 and 15. The single vector autocorrelation side band peak in FIG. 14 is maximized when θ=45°, and light represented by each column of $H'_i(v)$ is split equally between the fiber fast and slow axes and the side band amplitude drops into the noise floor when θ=0°. The orthogonal vector cross-correlation peak amplitude shown in FIG. 15 has a maximum at θ=0°, when light represented by each column of $H'_i(v)$ is in either the fast or slow axis. Two cross-correlation side band peaks are of equal amplitude are symmetric about v=0 at θ=45'; this condition represents when each column of $H'_i(v)$ is split equally between the fiber fast and slow birefringence axes.

Figure 15:
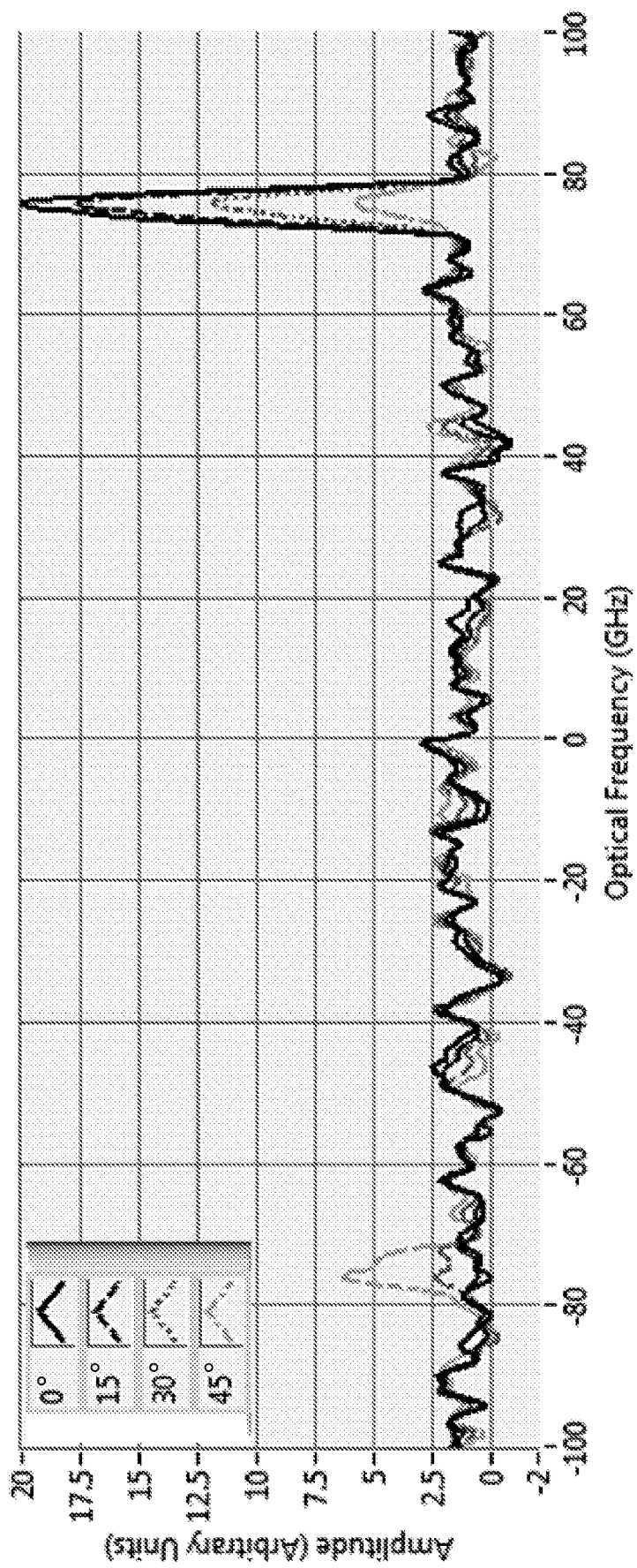
FIG. 15 shows example cross-correlation results for orthogonal 1×2 vectors of the transfer matrix for the reflection spectrums of a segment of Rayleigh scatter from a birefringent waveguide for four values of the rotation angle θ, which shows the sensitivity of the cross-correlation peak amplitude to the rotation angle.

Significantly, the signal to noise ratio is roughly 3.3 times higher for cross-correlation peak in FIG. 14 at θ=0° vs. the autocorrelation peak in FIG. 15 at θ=45°, and the signal to noise ratio of the cross-correlation peaks at θ=45° in FIG. 15 (a worst cross-correlation case) is roughly equal to the signal to noise ratio of the autocorrelation peak in FIG. 14 at θ=45° (the best autocorrelation case). Furthermore, computing the optical frequency shift of the cross-correlation peak is simpler and more efficient without the presence of a large correlation peak at 0.

Motion along the test fiber path and other noise sources can cause spurious sidebands on the central autocorrelation peak. These spurious sidebands can interfere with the birefringence induced sideband peak and increase birefringence measurement noise. Because the cross-correlation embodiments for obtaining the birefringence spectral shift lack a strong center peak, the spectral shift calculation quality is not be subjected to as much degradation in the presence of fiber motion or vibration.

Figure 16:
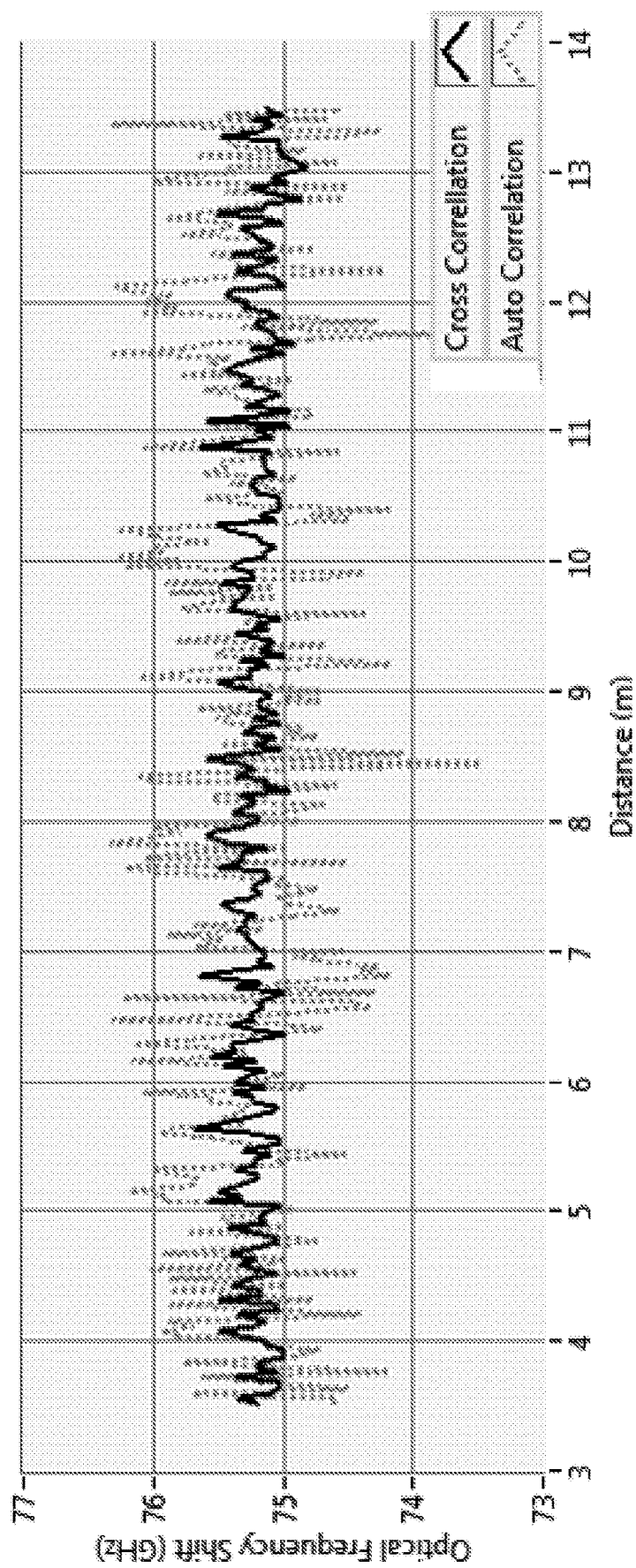
FIG. 16 shows the birefringence distribution for the PM fiber test device shown in FIG. 13, as calculated from the optical frequency shift results for the transfer matrix averaged autocorrelation method and the orthogonal vector cross-correlation method.

The birefringence induced optical frequency shifts for the polarization state averaged autocorrelation method (Equation 9) and the orthogonal vector cross-correlation method (Equation 12) for the same source data set are shown in FIG. 16. The cross-correlation results have roughly 3 times lower spatial variation than the autocorrelation results. Repeated measurements showed that most of the spatial variations observed in the cross-correlation results are repeatable and likely reflect real variations in the local transverse stress. Because of the spatial variation repeatability of the cross-correlation result, the improvement in the optical frequency shift signal-to-noise ratio is likely better than a 3× multiple.

Example Applications

The capability to measure both birefringence amplitude and the polarization state orientation in a distributed fashion along the length of the sensor presents a host of sensing opportunities and applications. One example is to measure both temperature and strain in a distributed fashion in PM fiber by measuring both fast and slow axes spectral shift between a reference state and a measurement state. Obtaining two spectral shifts allows for the simultaneous determination of both temperature and strain. The lack of a polarization alignment requirement simplifies sensor design and lowers sensor cost, and the noise improvements associated with the birefringence spectral shift techniques described above improve the temperature-strain discrimination resolution.

Another application is pressure sensing based on pressure induced birefringence variation in side-hole fiber. The ability to measure distributed birefringence with high spatial resolution in a low-profile sensor may be useful in situations where a high-pressure gradient is present. The lack of a polarization alignment requirement simplifies sensor design and lowers sensor cost, and the noise improvements associated with the birefringence spectral shift techniques described above improve the pressure resolution.

Fiber optic electric current sensors operate by sensing the polarization state rotation induced by current related magnetic fields through the Faraday effect. These sensors typically measure the total polarization state rotation through a sensor coil. The ability to measure polarization state orientation with high spatial resolution along the length of a sensor fiber enables the detection of steep magnetic field gradients.

When fiber optic strain sensors are embedded in structures, transverse strain induced birefringence is often present. The techniques described above may be used to sense and correct for this birefringence and thereby prevent large axial strain measurement errors. Further, the ability to measure strains both along and transverse to the fiber axis, and to measure the orientation of the transverse strain, can provide valuable information about the structure in which the fiber is embedded in.

When optical fiber is bent in a tight radius, e.g., generally below a radius of approximately 10 mm, and if the tight bend is held for long periods of time, the risk of breakage increases dramatically. Since bending induces birefringence in the fiber core, distributed birefringence measurement in accordance with the above techniques aid in finding potential spots where a fiber is installed with a tight bend radius that may result in a future break.

The above applications are just examples. Many other applications of the technology described in this application are contemplated.

Although the present disclosure has been described with reference to particular example embodiments, implementations, techniques, etc., it will be appreciated by those skilled in the art that the disclosure may be embodied in many other forms.

All methods described herein can be performed in any suitable order unless otherwise indicated herein. The use of any and all examples, or example language (e.g., "such as," "like," etc.) is intended merely to better illuminate the examples and does not pose a limitation on the scope of the claims appended hereto unless otherwise claimed. No language or terminology in this specification should be construed as indicating any non-claimed element as essential or critical.

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional. In the present application, the words "configured to . . . " are used to mean that an element of an apparatus has a configuration able to carry out the defined operation. In this context, a "configuration" means an arrangement or manner of interconnection. "Configured to" does not imply that the apparatus element needs to be changed in any way in order to provide the defined operation. The terms "wherein," "such that," etc. indicate structure, requirements of a method, and/or other features to be given patentable weight.

As used herein, the singular forms "a," "an," and "the" may also refer to plural articles, i.e., "one or more," "at least one," etc., unless specifically stated otherwise.

Recitation of specific values are provided as examples and are not intended to be limiting. Any range of values is merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller subranges are also included. The upper and lower limits of these smaller ranges are also included therein, subject to any specifically excluded limit in the stated range.

The term "about" or "approximately" means an acceptable error for a particular recited value, which depends in part on how the value is measured or determined. In certain embodiments, "about" can mean 1 or more standard deviations. When the antecedent term "about" is applied to a recited range or value it denotes an approximation within the deviation in the range or value known or expected in the art from the measurements method. For removal of doubt, it shall be understood that any range stated herein that does not specifically recite the term "about" before the range or before any value within the stated range inherently includes such term to encompass the approximation within the deviation noted above.

It is the express intention of the applicant not to invoke means-plus-function, step-plus-function, or other functional claiming treatment for any claim except for those in which the words "means for" or "step for" explicitly appear together with an associated function in such claim.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A method for determining birefringence of a waveguide segment at a particular location along the waveguide, where the waveguide has a first index of refraction for a first polarization state and a second, different index of refraction for a second polarization state that is substantially orthogonal to the first polarization state, the method comprising:
   coupling light with a first polarization state into the waveguide;
   detecting, at a polarization diverse receiver, first polarization state back scatter reflections associated with the waveguide segment corresponding to a first set of polarization state values;
   generating first polarization state back scatter data associated with the first polarization state back scatter reflections;
   coupling light with a second polarization state into the waveguide that is substantially orthogonal to the light with the first polarization state;
   detecting, at a polarization diverse receiver, second polarization state back scatter reflections associated with the waveguide segment corresponding to a second set of polarization state values different from the first set of polarization state values;
   generating second polarization state back scatter data associated with the second polarization state back scatter reflections;
   determining a spectral response based on the first polarization state back scatter data and the second polarization state back scatter data;
   computing a correlation based on the spectral response;
   determining the birefringence of the waveguide segment at the particular location along the waveguide based on the correlation; and
   using the determined birefringence to characterize the waveguide segment.

2. The method in claim 1, further comprising:
   forming a matrix based on the first polarization state back scatter data and the second polarization state back scatter data, and
   computing a spectral response for each component of the matrix.

3. The method in claim 2, further comprising:
   computing a spectral amplitude function based on the spectral responses computed for components, and calculating an autocorrelation of the spectral amplitude function.

4. The method in claim 3, further comprising:
determining a spectral shift from a main autocorrelation peak to a side autocorrelation peak, the spectral shift corresponding to the birefringence of the waveguide segment, and
determining the birefringence of the waveguide segment at the particular location along the waveguide based on the spectral shift.

5. The method in claim 3, wherein the matrix is a 2×2 matrix having four matrix components, the method further comprising:
combining the four matrix components;
determining a combined spectral amplitude function determined from the combined four matrix components, and
calculating the autocorrelation of the combined spectral amplitude function.

6. The method in claim 3, wherein the matrix is a 2×2 matrix having two 1×2 vectors, the method further comprising:
rotating the 2×2 matrix until one of the rotated 1×2 vectors represents light polarized in the fast polarization mode and the other of the rotated 1×2 vectors represents light polarized in the slow polarization mode.

7. The method in claim 6, further comprising:
storing in memory one or more rotation angles associated with the rotating of the 2×2 matrix, and
using the one or more rotation angles to characterize the waveguide segment.

8. The method in claim 6, further comprising:
combining the one rotated 1×2 vector and the other rotated 1×2 vector to produce a combined result,
computing a fast spectral amplitude function and a slow spectral amplitude function based on the combined result.

9. The method in claim 8, further comprising:
computing a cross-correlation of the fast spectral amplitude function and the slow spectral amplitude function;
determining a spectral shift of a cross-correlation peak from zero; and
determining the birefringence of the waveguide segment at the particular location along the waveguide based on the spectral shift.

10. The method in claim 1, wherein the coupling includes scanning the waveguide with a tunable laser, wherein light from the laser is reflected as a result of Rayleigh scattering in the waveguide and corresponds to the scatter reflections.

11. The method in claim 1, further comprising:
determining a birefringence value for each of multiple waveguide segments along the waveguide, and
combining the birefringence values for the multiple waveguide segments to form a birefringence distribution over the length of the waveguide.

12. The method in claim 1, further comprising determining strain or temperature based on the determined birefringence or discriminating between strain and temperature based on the determined birefringence.

13. The method in claim 1, further comprising determining local curvature or bending based on the determined birefringence.

14. The method in claim 1, further comprising determining pressure based on the determined birefringence.

15. The method in claim 1, further comprising determining magnetic or electric field strength based on the determined birefringence.

16. An optical apparatus for determining birefringence of a waveguide segment at a particular location along the waveguide, comprising:
a light source to couple light with a first polarization state into the waveguide and to couple light with a second polarization state into the waveguide, wherein the second polarization state is substantially orthogonal to the first polarization state;
optical detection circuitry configured to:
detect first polarization state back scatter reflections associated with the waveguide segment corresponding to a first set of polarization state values and generate first polarization state back scatter data associated with the first polarization state back scatter reflections, and
detect second polarization state back scatter reflections associated with the waveguide segment corresponding to a second set of polarization state values different from the first set of polarization state values and generate second polarization state back scatter data associated with the second polarization state back scatter reflections;
processing circuitry configured to:
determine a spectral response based on the first polarization state back scatter data and the second polarization state back scatter data;
compute a correlation based on the spectral response;
determine the birefringence of the waveguide segment at the particular location along the waveguide based on the correlation; and
use the determined birefringence to characterize the waveguide segment.

17. The optical apparatus in claim 16, wherein the optical apparatus includes an optical vector analysis network comprising:
a launch conditioning network, coupled to the light source, including a first light path and a second light path, where the second light path is delayed with respect to the first light path, and a polarization controller to ensure light in the first light path is substantially orthogonal to light in the second light path; and
a measurement interferometer to combine the light from first and second paths in the launch conditioning network with light reflected from the waveguide,
wherein the optical detection circuitry includes a polarization diverse receiver, coupled to the measurement interferometer, to separately detect the first polarization state back scatter data and the second polarization state back scatter data.

18. The optical apparatus in claim 16, wherein the light source is configured to couple light with the first polarization state into the waveguide during a first time period and to couple light with the second polarization state into the waveguide during a second time period, and
wherein the optical apparatus includes an optical backscatter reflectometer network comprising:
a polarization controller to switch between two orthogonal polarization launch states for the first and second time periods; and
a measurement interferometer to combine the light from the polarization controller with light reflected from the waveguide,
wherein the optical detection circuitry includes a polarization diverse receiver, coupled to the measurement interferometer, to separately detect the first polarization state back scatter data and the second polarization state back scatter data.

19. The optical apparatus in claim 16, wherein the processing circuitry is configured to:
form a matrix based on the first polarization state back scatter data and the second polarization state back scatter data, and
compute a spectral response for each component of the matrix.

20. The optical apparatus in claim 19, wherein the processing circuitry is configured to:
compute a spectral amplitude function based on the spectral responses computed for components, and
calculate an autocorrelation of the spectral amplitude function.

21. The optical apparatus in claim 20, wherein the processing circuitry is configured to:
determine a spectral shift from a main autocorrelation peak to a side autocorrelation peak, the spectral shift corresponding to the birefringence of the waveguide segment, and
determine the birefringence of the waveguide segment at the particular location along the waveguide based on the spectral shift.

22. The optical apparatus in claim 20, wherein the matrix is a 2×2 matrix having four matrix components, and wherein the processing circuitry is configured to:
combine the four matrix components;
determine a combined spectral amplitude function determined from the combined four matrix components, and
calculate the autocorrelation of the combined spectral amplitude function.

23. The optical apparatus in claim 20, wherein the matrix is a 2×2 matrix having two 1×2 vectors, and wherein the processing circuitry is configured to:
rotate the 2×2 matrix until one of the rotated 1×2 vectors represents light polarized in the fast polarization mode and the other of the rotated 1×2 vectors represents light polarized in the slow polarization mode.

24. The optical apparatus in claim 23, wherein the processing circuitry is configured to:
store in memory one or more rotation angles associated with the rotating of the 2×2 matrix, and
use the one or more rotation angles to characterize the waveguide segment.

25. The optical apparatus in claim 23, wherein the processing circuitry is configured to:
combine the one rotated 1×2 vector and the other rotated 1×2 vector to produce a combined result,
compute a fast spectral amplitude function and a slow spectral amplitude function based on the combined result.

26. The optical apparatus in claim 25, wherein the processing circuitry is configured to:
compute a cross-correlation of the fast spectral amplitude function and the slow spectral amplitude function;
determine a spectral shift of a cross-correlation peak from zero; and
determine the birefringence of the waveguide segment at the particular location along the waveguide based on the spectral shift.

27. The optical apparatus in claim 16, wherein the processing circuitry is configured to:
determine a birefringence value for each of multiple waveguide segments along the waveguide, and
combine the birefringence values for the multiple waveguide segments to form a birefringence distribution over the length of the waveguide.

28. An optical apparatus for determining polarization mode dispersion for a waveguide segment at a particular location along the waveguide, comprising:
a light source to couple light with a first polarization state into the waveguide and to couple light with a second polarization state into the waveguide, wherein the second polarization state is substantially orthogonal to the first polarization state;
optical detection circuitry configured to:
detect first polarization state back scatter reflections associated with the waveguide segment corresponding to a first set of polarization state values and generate first polarization state back scatter data associated with the first polarization state back scatter reflections, and
detect second polarization state back scatter reflections associated with the waveguide segment corresponding to a second set of polarization state values different from the first set of polarization state values and generate second polarization state back scatter data associated with the second polarization state back scatter reflections;
processing circuitry configured to:
determine a time delay domain response based on the first polarization state back scatter data and the second polarization state back scatter data;
compute a correlation based on the time delay domain response;
determine a time delay associated with the polarization mode dispersion of the waveguide segment at the particular location along the waveguide based on the correlation; and
use the time delay associated with the polarization mode dispersion to characterize the waveguide segment.

29. The optical apparatus in claim 28, wherein:
the time delay domain response is a time domain polarization state averaged amplitude function,
the correlation is an autocorrelation, and
the processing circuitry is configured to determine the time delay associated with the polarization mode dispersion based on a separation between a center peak and a side band resulting from the autocorrelation.

30. The optical apparatus in claim 28, wherein:
the time delay domain response is a time domain transfer function,
the correlation is a cross-correlation, and
the processing circuitry is configured to determine the time delay associated with the polarization mode dispersion based on a separation between zero and a side band resulting from the cross-correlation.

* * * * *